US009031857B2

(12) United States Patent  (10) Patent No.: US 9,031,857 B2
Angell et al.  (45) Date of Patent: May 12, 2015

(54) GENERATING CUSTOMIZED MARKETING MESSAGES AT THE CUSTOMER LEVEL BASED ON BIOMETRIC DATA

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 2350 days.

(21) Appl. No.: 11/743,982

(22) Filed: May 3, 2007

(65) Prior Publication Data

US 2008/0249856 A1    Oct. 9, 2008

Related U.S. Application Data

(63) Continuation-in-part of application No. 11/695,983, filed on Apr. 3, 2007.

(51) Int. Cl.
*G06Q 30/00* (2012.01)
*G06Q 30/02* (2012.01)

(52) U.S. Cl.
CPC ............ *G06Q 30/02* (2013.01); *G06Q 30/0271* (2013.01)

(58) Field of Classification Search
USPC .......................................................... 705/14
See application file for complete search history.

(56) References Cited

U.S. PATENT DOCUMENTS

| 4,929,819 A | 5/1990 | Collins, Jr. |
| 5,091,780 A | 2/1992 | Pomerleau |
| 5,231,483 A | 7/1993 | Sieber et al. |
| 5,233,513 A | 8/1993 | Doyle |
| 5,511,006 A | 4/1996 | Tachibana et al. |
| 5,729,697 A | 3/1998 | Schkolnick et al. |
| 5,799,292 A | 8/1998 | Hekmatpour |
| 5,855,008 A | 12/1998 | Goldhaber et al. |
| 5,898,475 A | 4/1999 | Martin |
| 5,918,211 A | 6/1999 | Sloane |
| 5,933,811 A | 8/1999 | Angles et al. |
| 5,956,081 A | 9/1999 | Katz et al. |
| 6,009,410 A | 12/1999 | LeMole et al. |
| 6,028,626 A | 2/2000 | Aviv |

(Continued)

FOREIGN PATENT DOCUMENTS

| GB | 2247592 A | 3/1992 |
| JP | 2003187335 A | 7/2003 |

(Continued)

OTHER PUBLICATIONS

U.S. Appl. No. 11/861,520, filed Sep. 26, 2007, Angell et al.

(Continued)

*Primary Examiner* — Alvin L Brown
(74) *Attorney, Agent, or Firm* — Yee & Associates, P.C.; John R. Pivnichny

(57) ABSTRACT

A computer implemented method, apparatus, and computer usable program code for customizing digital media marketing messages using biometric data. In one embodiment, data is received from a set of biometric devices associated with a retail facility to form the biometric data. The biometric data is associated with a given customer. The biometric data is processed to form dynamic data. The dynamic data is analyzed using a data model to identify personalize marketing message criteria for the customer. A customized marketing message is generated using the personalized marketing message criteria.

33 Claims, 6 Drawing Sheets

(56) References Cited

U.S. PATENT DOCUMENTS

| | | |
|---|---|---|
| 6,032,127 A | 2/2000 | Schkolnick et al. |
| 6,052,676 A | 4/2000 | Hekmatpour |
| 6,055,513 A | 4/2000 | Katz et al. |
| 6,101,486 A | 8/2000 | Roberts et al. |
| 6,115,709 A | 9/2000 | Gilmour et al. |
| 6,118,887 A | 9/2000 | Cosatto et al. |
| 6,128,663 A | 10/2000 | Thomas |
| 6,167,441 A | 12/2000 | Himmel |
| 6,191,692 B1 | 2/2001 | Stoltz et al. |
| 6,226,784 B1 | 5/2001 | Holmes et al. |
| 6,249,768 B1 | 6/2001 | Tulskie, Jr. et al. |
| 6,266,649 B1 | 7/2001 | Linden et al. |
| 6,334,109 B1 | 12/2001 | Kanevsky et al. |
| 6,366,298 B1 | 4/2002 | Haisuka et al. |
| 6,393,163 B1 | 5/2002 | Burt et al. |
| 6,400,276 B1 | 6/2002 | Clark |
| 6,507,366 B1 | 1/2003 | Lee |
| 6,560,639 B1 | 5/2003 | Dan et al. |
| 6,571,216 B1 | 5/2003 | Garg et al. |
| 6,571,279 B1 | 5/2003 | Herz et al. |
| 6,584,445 B2 | 6/2003 | Papageorge |
| 6,593,852 B2 | 7/2003 | Gutta et al. |
| 6,647,257 B2 | 11/2003 | Owensby |
| 6,647,269 B2 | 11/2003 | Hendrey et al. |
| 6,659,344 B2 | 12/2003 | Otto et al. |
| 6,738,532 B1 | 5/2004 | Oldroyd |
| 6,754,389 B1 | 6/2004 | Dimitrova et al. |
| 6,829,475 B1 | 12/2004 | Lee et al. |
| 6,856,249 B2 | 2/2005 | Strubbe et al. |
| 6,879,960 B2 | 4/2005 | Nascenzi et al. |
| 6,976,000 B1 | 12/2005 | Manganaris et al. |
| 7,010,501 B1 | 3/2006 | Roslak et al. |
| 7,028,018 B2 | 4/2006 | Kocher |
| 7,044,369 B2 | 5/2006 | Gantz |
| 7,080,778 B1 | 7/2006 | Kressin et al. |
| 7,092,959 B2 | 8/2006 | Chen et al. |
| 7,118,476 B1 | 10/2006 | White et al. |
| 7,168,618 B2 | 1/2007 | Schwartz |
| 7,195,157 B2 | 3/2007 | Swartz et al. |
| 7,200,266 B2 | 4/2007 | Ozer et al. |
| 7,224,852 B2 | 5/2007 | Lipton et al. |
| 7,310,442 B2 | 12/2007 | Monachino et al. |
| 7,319,379 B1 | 1/2008 | Melvin |
| 7,319,479 B1 | 1/2008 | Crabtree et al. |
| 7,357,316 B2 | 4/2008 | Heckel et al. |
| 7,370,004 B1 | 5/2008 | Patel et al. |
| 7,394,916 B2 | 7/2008 | Brodsky et al. |
| 7,472,080 B2 | 12/2008 | Goel |
| 7,480,395 B2 | 1/2009 | Parunak et al. |
| 7,548,874 B2 | 6/2009 | Kanevsky et al. |
| 7,606,728 B2 | 10/2009 | Sorensen |
| 7,630,986 B1 | 12/2009 | Herz et al. |
| 7,673,797 B2 | 3/2010 | Edwards |
| 7,687,744 B2 | 3/2010 | Walter et al. |
| 7,788,170 B2 | 8/2010 | Lilly et al. |
| 7,801,762 B2 | 9/2010 | Walker et al. |
| 7,813,952 B2 | 10/2010 | Eskandari |
| 7,826,923 B2 | 11/2010 | Walker et al. |
| 7,865,371 B2 | 1/2011 | Shen |
| 7,908,233 B2 | 3/2011 | Angell et al. |
| 7,908,237 B2 | 3/2011 | Angell et al. |
| 7,925,549 B2 | 4/2011 | Looney et al. |
| 7,933,797 B2 | 4/2011 | Sorensen |
| 7,975,917 B2 | 7/2011 | Clark et al. |
| 8,195,499 B2 | 6/2012 | Angell et al. |
| 2002/0091568 A1 | 7/2002 | Kraft et al. |
| 2002/0107741 A1 | 8/2002 | Stern et al. |
| 2002/0111852 A1 | 8/2002 | Levine |
| 2002/0116265 A1 | 8/2002 | Hernandez |
| 2002/0121547 A1 | 9/2002 | Wieth et al. |
| 2002/0143613 A1 | 10/2002 | Hong et al. |
| 2002/0161651 A1 | 10/2002 | Godsey et al. |
| 2002/0171736 A1 | 11/2002 | Gutta et al. |
| 2002/0178013 A1 | 11/2002 | Hoffman et al. |
| 2003/0088463 A1 | 5/2003 | Kanevsky et al. |
| 2003/0105667 A1 | 6/2003 | Millikan |
| 2003/0107650 A1 | 6/2003 | Colmenarez et al. |
| 2003/0212580 A1 | 11/2003 | Shen |
| 2003/0217024 A1 | 11/2003 | Kocher |
| 2003/0228035 A1 | 12/2003 | Parunak et al. |
| 2003/0231769 A1 | 12/2003 | Bolle et al. |
| 2004/0078236 A1 | 4/2004 | Stoodley et al. |
| 2004/0111454 A1 | 6/2004 | Sorensen |
| 2004/0113933 A1 | 6/2004 | Guler |
| 2004/0120581 A1 | 6/2004 | Ozer et al. |
| 2004/0125125 A1 | 7/2004 | Levy |
| 2004/0143505 A1 | 7/2004 | Kovach |
| 2004/0151374 A1 | 8/2004 | Lipton et al. |
| 2004/0156530 A1 | 8/2004 | Brodsky et al. |
| 2004/0225627 A1 | 11/2004 | Botros et al. |
| 2005/0002561 A1 | 1/2005 | Monachino et al. |
| 2005/0012817 A1 | 1/2005 | Hampapur et al. |
| 2005/0185392 A1 | 8/2005 | Walter et al. |
| 2005/0187819 A1 | 8/2005 | Johnson |
| 2006/0007308 A1 | 1/2006 | Ide et al. |
| 2006/0010028 A1 | 1/2006 | Sorensen |
| 2006/0032914 A1 | 2/2006 | Brewster et al. |
| 2006/0032915 A1 | 2/2006 | Schwartz |
| 2006/0074769 A1 | 4/2006 | Looney et al. |
| 2006/0089918 A1 | 4/2006 | Avanzi et al. |
| 2006/0116927 A1 | 6/2006 | Miller, III et al. |
| 2006/0184410 A1 | 8/2006 | Ramamurthy et al. |
| 2006/0190419 A1 | 8/2006 | Bunn et al. |
| 2006/0200378 A1 | 9/2006 | Sorensen |
| 2006/0218057 A1 | 9/2006 | Fitzpatrick et al. |
| 2006/0219780 A1 | 10/2006 | Swartz et al. |
| 2006/0251541 A1 | 11/2006 | Santandrea |
| 2007/0008408 A1 | 1/2007 | Zehavi |
| 2007/0050828 A1 | 3/2007 | Renzi et al. |
| 2007/0052536 A1 | 3/2007 | Hawkes et al. |
| 2007/0069014 A1 | 3/2007 | Heckel et al. |
| 2007/0078759 A1 | 4/2007 | Lilly et al. |
| 2007/0100649 A1 | 5/2007 | Walker et al. |
| 2007/0112713 A1 | 5/2007 | Seaman et al. |
| 2007/0118419 A1 | 5/2007 | Maga et al. |
| 2007/0192183 A1 | 8/2007 | Monaco et al. |
| 2007/0244766 A1 | 10/2007 | Goel |
| 2007/0244778 A1 | 10/2007 | Bailard |
| 2007/0282665 A1 | 12/2007 | Buehler et al. |
| 2007/0291118 A1 | 12/2007 | Shu et al. |
| 2007/0294706 A1 | 12/2007 | Neuhauser et al. |
| 2008/0004951 A1* | 1/2008 | Huang et al. ............ 705/14 |
| 2008/0010114 A1 | 1/2008 | Head |
| 2008/0027788 A1 | 1/2008 | Lawrence et al. |
| 2008/0033752 A1* | 2/2008 | Rodgers .................. 705/2 |
| 2008/0059282 A1 | 3/2008 | Vallier et al. |
| 2008/0059297 A1 | 3/2008 | Vallier et al. |
| 2008/0077493 A1 | 3/2008 | Geffert |
| 2008/0089107 A1 | 4/2008 | Lee et al. |
| 2008/0114633 A1 | 5/2008 | Wolf et al. |
| 2008/0147511 A1 | 6/2008 | Edwards |
| 2008/0215391 A1 | 9/2008 | Dowling et al. |
| 2008/0243626 A1 | 10/2008 | Stawar et al. |
| 2008/0249793 A1 | 10/2008 | Angell et al. |
| 2008/0249835 A1 | 10/2008 | Angell et al. |
| 2008/0249836 A1 | 10/2008 | Angell et al. |
| 2008/0249837 A1 | 10/2008 | Angell et al. |
| 2008/0249838 A1 | 10/2008 | Angell et al. |
| 2008/0249851 A1 | 10/2008 | Angell et al. |
| 2008/0249857 A1 | 10/2008 | Angell et al. |
| 2008/0249858 A1 | 10/2008 | Angell et al. |
| 2008/0249859 A1 | 10/2008 | Angell et al. |
| 2008/0249864 A1 | 10/2008 | Angell et al. |
| 2008/0249865 A1 | 10/2008 | Angell et al. |
| 2008/0249866 A1 | 10/2008 | Angell et al. |
| 2008/0249867 A1 | 10/2008 | Angell et al. |
| 2008/0249868 A1 | 10/2008 | Angell et al. |
| 2008/0249869 A1 | 10/2008 | Angell et al. |
| 2008/0249870 A1 | 10/2008 | Angell et al. |
| 2008/0270172 A1* | 10/2008 | Luff et al. ............ 705/1 |
| 2008/0270220 A1 | 10/2008 | Ramer et al. |
| 2008/0270222 A1 | 10/2008 | Goel |
| 2009/0002155 A1 | 1/2009 | Ma et al. |
| 2009/0005650 A1 | 1/2009 | Angell et al. |

(56) References Cited

U.S. PATENT DOCUMENTS

| | | | |
|---|---|---|---|
| 2009/0006125 | A1 | 1/2009 | Angell et al. |
| 2009/0006286 | A1 | 1/2009 | Angell et al. |
| 2009/0006295 | A1 | 1/2009 | Angell et al. |
| 2009/0037193 | A1* | 2/2009 | Vempati et al. ............... 705/1 |
| 2009/0083121 | A1 | 3/2009 | Angell et al. |
| 2009/0083122 | A1 | 3/2009 | Angell et al. |
| 2009/0089107 | A1 | 4/2009 | Angell et al. |
| 2009/0198625 | A1 | 8/2009 | Walker et al. |
| 2009/0234878 | A1 | 9/2009 | Herz et al. |
| 2009/0322492 | A1 | 12/2009 | Hannah et al. |
| 2010/0023372 | A1* | 1/2010 | Gonzalez ..................... 705/10 |
| 2010/0026802 | A1 | 2/2010 | Titus et al. |
| 2010/0032482 | A1 | 2/2010 | Clark et al. |
| 2010/0169229 | A1 | 7/2010 | Lee |
| 2010/0180029 | A1 | 7/2010 | Fourman |
| 2010/0299210 | A1 | 11/2010 | Giraud et al. |
| 2011/0004511 | A1 | 1/2011 | Reich |
| 2012/0328263 | A1 | 12/2012 | Barton et al. |
| 2013/0096966 | A1 | 4/2013 | Barnes, Jr. |

FOREIGN PATENT DOCUMENTS

| | | |
|---|---|---|
| JP | 2003263544 A | 9/2003 |
| WO | 0217235 A2 | 2/2002 |
| WO | 0217235 A3 | 2/2002 |

OTHER PUBLICATIONS

U.S. Appl. No. 11/861,590, filed Sep. 26, 2007, Angell et al.
U.S. Appl. No. 11/861,729, filed Sep. 26, 2007, Angell et al.
U.S. Appl. No. 11/862,279, filed Sep. 27, 2007, Angell et al.
U.S. Appl. No. 11/862,294, filed Sep. 27, 2007, Angell et al.
U.S. Appl. No. 11/862,299, filed Sep. 27, 2007, Angell et al.
U.S. Appl. No. 11/862,306 filed Sep. 27, 2007, Angell et al.
U.S. Appl. No. 11/862,320, filed Sep. 27, 2007, Angell et al.
U.S. Appl. No. 11/862,323, filed Sep. 27, 2007, Angell et al.
U.S. Appl. No. 11/744,024, filed May 3, 2007, Angell et al.
U.S. Appl. No. 11/769,409, filed Jun. 27, 2007, Angell et al.
U.S. Appl. No. 11/756,198, filed May 31, 2007, Angell et al.
U.S. Appl. No. 11/771,252, filed Jun. 29, 2007, Angell et al.
U.S. Appl. No. 11/764,524, filed Jun. 18, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/771,887, filed Jun. 29, 2007, Angell et al.
U.S. Appl. No. 11/771,912, filed Jun. 29, 2007, Angell et al.
U.S. Appl. No. 11/861,966, filed Sep. 26, 2007, Angell et al.
U.S. Appl. No. 11/861,975, filed Sep. 26, 2007, Angell et al.
USPTO office action for U.S. Appl. No. 11/695,983, dated Mar. 25, 2010.
USPTO office action for U.S. Appl. No. 11/861,520, dated May 6, 2010.
USPTO office action for U.S. Appl. No. 11/769,409, dated Apr. 14, 2010.
USPTO office action for U.S. Appl. No. 11/756,198, dated Apr. 22, 2010.
USPTO office action for U.S. Appl. No. 11/771,252, dated May 5, 2010.
USPTO office action for U.S. Appl. No. 11/764,524, dated Apr. 15, 2010.
USPTO office action for U.S. Appl. No. 11/861,528, dated May 13, 2010.
USPTO office action for U.S. Appl. No. 11/771,887, dated Mar. 8, 2010.
USPTO office action for U.S. Appl. No. 11/771,912, dated Apr. 8, 2010.
Wu et al. "Vehicle Sound Signature Recognition by Frequency Vector Principal Component Analysis", IEEE Instrumentation and Measurement Technology Conference, May 18-20, 1998, pp. 429-434.
Kosba, et al, "Personalized Hypermedia Presentation Techniques for Improving Online Customer Relationships", The Knowledge Engineering Review, Vo 16:2, 2001, pp. 111-155.
Ng, Cheuk-Fan, Satisfying shoppers psychological needs: From public market to cyber-mall, 2002, Journal of Environmental Psycology, 23 (2003) pp. 439-455.
USPTO office action for U.S. Appl. No. 11/861,590, dated Jun. 15, 2010.
USPTO office action for U.S. Appl. No. 11/861,729, dated Jun. 15, 2010.
USPTO office action for U.S. Appl. No. 11/862,306, dated Jun. 24, 2010.
USPTO office action for U.S. Appl. No. 11/862,320, dated Aug. 5, 2010.
USPTO Notice of allowance for U.S. Appl. No. 11/771,887, dated Sep. 2, 2010.
USPTO final office action for U.S. Appl. No. 11/756,198, dated Aug. 31, 2010.
USPTO office action for U.S. Appl. No. 11/862,374, dated Aug. 19, 2010.
USPTO final office action for U.S. Appl. No. 11/769,409, dated Aug. 31, 2010.
USPTO final office action for U.S. Appl. No. 11/771,912, dated Jul. 21, 2010.
USPTO final office action for U.S. Appl. No. 11/861,528, dated Sep. 9, 2010.
Knuchel et al., "A Learning based approach for anonymous Recommendation", Proceedings of the 8th IEEE International Conference on E-Commerce Technology and the 3rd IEEE International Conference on Enterprise Computing, E-Commerce and E-Services, 2006, pp. 1-8.
"CRM Marketing Initiatives," In: The CRM Handbook: A Business Guide to Customer Relationship Management, Dyche (Ed.), Addison-Wesley Professional, Aug. 9, 2001, excerpt from http://academic.safaribooksonline.com/print?xmlid=0-201-73062-6/ch02lev1sec3, downloaded Jan. 23, 2012, 13 pages.
"Infogrames Brings Sense of Touch to Web Sites with Immersion Technology," Immersion Corporation, May 22, 2000, 2 pages.
Anupam et al., "Personalizing the Web Using Site Descriptions," Proceedings of the 10th International Workshop on Database and Expert Systems Applications, Florence, Italy, Sep. 1-3, 1999, pp. 732-738.
Bestavros, "Banking Industry Walks 'Tightrope' in Personalization of Web Services," Bank Systems & Technology, 37(1):54, Jan. 2000.
Collins et al., "A System for Video Surveillance and Monitoring," Technical Report CMU-RI-TR-00-12, Robotics Institute, Carnegie Mellon University, May 2000, 69 pages.
Greiffenhagen et al., "Design, Analysis, and Engineering of Video Monitoring Systems: An Approach and a Case Study," Proceedings of the IEEE, 89(10):1498-1517, Oct. 2001.
Hampapur et al., "Smart Video Surveillance—Exploring the Concept of Multiscale Spatiotemporal Tracking," IEEE Signal Processing Magazine, 22(2):38-51, Mar. 2005.
Jones, "What's Your 'Risk Score'?" in These Times, https://www.inthesetimes.org/article/586/whats_your_, May 28, 2003, 3 pages.
Kittle, "Pilfered Profits; Both Retailers and Consumers Take a Hit from Shoplifting," Telegraph—Herald, Dubuque, Iowa, Apr. 28, 2008, http://proquest.umi.com/pdqweb?index=2&did=634769861&SrchMode=2&sid=5&Fmt=3, accessed Jul. 29, 2010, 5 pages.
Kuhn, "Affinity Architecture: Towards a Model for Planning and Designing Comprehensively Personalised Web Applications," Journal of AGASI, pp. 60-63, Jul. 1999.
Lipton et al., "Critical Asset Protection, Perimeter Monitoring, and Threat Detection Using Automated Video Surveillance," Proceedings of the 36th Annual International Carnahan Conference on Security Technology, Dec. 2002, pp. 1-11.
Mitchell, "Computerizing Video Surveillance Techniques," IBM Technical Disclosure Bulletin, n5 10-92, pp. 403, Oct. 1, 1992.
Sandler, "Tavern Camera Mandate Proposed: Milwaukee Alderman Hopes to Log Evidence of Misbehavior, Crime," Knight Ridder Tribune Business News, Washington, D.C., Oct. 4, 2006, http://proquest.umi.com/pdqweb?index=2&did=1139882851&SrchMode=2&sid=1&Fmt=, accessed Aug. 12, 2011, 2 pages.
"Software Models," Excel Software, http://web.archive.org/web/19990203054425/excelsoftware.com/models.hml, Oct. 1996, 11 pages.

(56) References Cited

OTHER PUBLICATIONS

"Software Prototyping," University of Houston, Sep. 22, 2008, 32 pages.
Office Action regarding U.S. Appl. No. 09/761,121, dated Mar. 3, 2004, 9 pages.
Final Office Action regarding U.S. Appl. No. 09/761,121, dated Nov. 24, 2004, 6 pages.
Office Action regarding U.S. Appl. No. 09/761,121, dated May 24, 2005, 8 pages.
Final Office Action regarding U.S. Appl. No. 09/761,121, dated Nov. 16, 2005, 8 pages.
Office Action regarding U.S. Appl. No. 09/761,121, dated Jun. 10, 2010, 10 pages.
Final Office Action regarding U.S. Appl. No. 09/761,121, dated Oct. 25, 2010, 8 pages.
Notice of Allowance regarding U.S. Appl. No. 10/918,521, dated Sep. 27, 2006, 11 pages.
Office Action regarding U.S. Appl. No. 11/455,251, dated Dec. 10, 2010, 7 pages.
Final Office Action regarding U.S. Appl. No. 11/455,251, dated Apr. 27, 2011, 5 pages.
Office Action regarding U.S. Appl. No. 11/744,024, dated Sep. 28, 2010, 37 pages.
Final Office Action regarding U.S. App. No. 11/744,024, dated Mar. 4, 2011, 30 pages.
Final Office Action regarding U.S. Appl. No. 11/861,590, dated Nov. 18, 2010, 31 pages.
Notice of Allowance regarding U.S. Appl. No. 11/771,912, dated Nov. 5, 2010, 12 pages.
Office Action regarding U.S. Appl. No. 11/771,860, dated Sep. 29, 2010, 15 pages.
Final Office Action regarding U.S. Appl. No. 11/771,860, dated Mar. 1, 2011, 13 pages.
Office Action regarding U.S. Appl. No. 11/771,860, dated Nov. 17, 2011, 14 pages.
Final Office Action regarding U.S. Appl. No. 11/771,860, dated May 24, 2012, 14 pages.
Liraz, "Improving Your Sales Skills," Marketing Management, BizMove Busines Guides, Feb. 1, 2001, 9 pages.
Lyall, "What's the Buzz? Rowdy Teenagers Don't Want to Hear It," Barry Journal, The New York Times, Nov. 2005, 1 page.
Office Action regarding U.S. Appl. No. 11/756,198, dated Sep. 26, 2013, 68 pages.
Final Office Action regarding U.S. Appl. No. 11/756,198, dated Apr. 24, 2014, 31 pages.
Office Action regarding U.S. Appl. No. 11/771,252, dated Sep. 18, 2013, 70 pages.
Final Office Action regarding U.S. Appl. No. 11/771,252, dated Feb. 26, 2014, 33 pages.
Notice of Allowance regarding U.S. Appl. No. 11/771,252, dated Mar. 25, 2014, 21 pages.
Office Action regarding U.S. Appl. No. 11/862,279, dated Jul. 18, 2013, 60 pages.
Final Office Action regarding U.S. Appl. No. 11/862,279, dated Dec. 30, 2013, 16 pages.
Office Action regarding U.S. Appl. No. 11/862,306, dated Oct. 15, 2013, 67 pages.
Final Office Action regarding U.S. Appl. No. 11/862,306, dated Feb. 11, 2014, 27 pages.
Notice of Allowance regarding U.S. Appl. No. 11/862,306, May 1, 2014, 28 pages.
Office Action regarding U.S. Appl. No. 11/862,320, dated Dec. 3, 2013, 72 pages.
Notice of Allowance regarding U.S. Appl. No. 11/862,320, dated Feb. 26, 2014, 8 pages.
Office Action regarding U.S. Appl. No. 11/862,323, dated Mar. 15, 2013, 23 pages.
Final Office Action regarding U.S. Appl. No. 11/862,323, dated Aug. 19, 2013, 40 pages.
Office Action regarding U.S. Appl. No. 11/862,323, dated Jan. 28, 2014, 25 pages.
Final Office Action regarding U.S. Appl. No. 11/862,323, dated Jun. 3, 2013, 27 pages.
Office action dated Jun. 12, 2014, regarding USPTO U.S. Appl. No. 11/455,251, 7 pages.
Office action dated Oct. 23, 2014, regarding USPTO U.S. Appl. No. 11/455,251, 8 pages.
Office Action regarding U.S. Appl. No. 11/771,884, dated Sep. 23, 2010, 15 pages.
Final Office Action regarding U.S. Appl. No. 11/771,884, dated Mar. 18, 2011, 13 pages.
Office Action regarding U.S. Appl. No. 11/771,884, dated Aug. 17, 2011, 14 pages.
Final Office Action regarding U.S. Appl. No. 11/771,884, dated Feb. 28, 2012, 17 pages.
Final Office Action regarding U.S. Appl. No. 11/861,520, dated Oct. 28, 2010, 26 pages.
Final Office Action regarding U.S. Appl. No. 11/861,729, dated Nov. 18, 2010, 38 pages.
Office Action regarding U.S. Appl. No. 11/861,966, dated Feb. 4, 2011, 32 pages.
Final Office Action regarding U.S. Appl. No. 11/861,966, dated Jul. 22, 2011, 21 pages.
Office Action regarding U.S. Appl. No. 11/861,975, dated Dec. 22, 2010, 27 pages.
Final Office Action regarding U.S. Appl. No. 11/861,975, dated Jun. 6, 2011, 29 pages.
Notice of Allowance regarding U.S. Appl. No. 11/861,975, dated Feb. 3, 2012, 14 pages.
Office Action regarding U.S. Appl. No. 11/862,294, dated May 13, 2010, 19 pages.
Office Action regarding U.S. Appl. No. 11/862,294, dated Nov. 1, 2010, 25 pages.
Final Office Action regarding U.S. Appl. No. 11/862,294, dated Apr. 14, 2011, 23 pages.
Office Action regarding U.S. Appl. No. 11/862,299, dated Feb. 24, 2011, 24 pages.
Final Office Action regarding U.S. Appl. No. 11/862,299, dated Aug. 18, 2011, 25 pages.
Final Office Action regarding U.S. Appl. No. 11/764,524, dated Aug. 19, 2010, 25 pages.
Final Office Action regarding U.S. Appl. No. 11/862,306, dated Dec. 3, 2010, 26 pages.
Office Action regarding U.S. Appl. No. 11/862,323, dated Sep. 3, 2010, 26 pages.
Office Action regarding U.S. Appl. No. 11/862,323, dated Feb. 17, 2011, 21 pages.
Final Office Action regarding U.S. Appl. No. 11/862,323, dated Aug. 19, 2011, 21 pages.
Final Office Action regarding U.S. Appl. No. 11/862,320, dated Jan. 11, 2011, 19 pages.
Final Office Action regarding U.S. Appl. No. 11/771,252, dated Oct. 15, 2010, 20 pages.
Final Office Action regarding U.S. Appl. No. 11/862,374, dated Jan. 28, 2011, 34 pages.
Final Office Action regarding U.S. Appl. No. 11/862,374, dated May 12, 2011, 31 pages.
Office Action regarding U.S. Appl. No. 11/862,374, dated Aug. 31, 2011, 37 pages.
Final Office Action regarding U.S. Appl. No. 11/862,374, dated Jan. 4, 2012, 36 pages.
Office Action regarding U.S. Appl. No. 11/862,323, dated Aug. 28, 2014, 32 pages.
Notice of Allowance regarding U.S. Appl. No. 11/769,409, dated Sep. 13, 2013, 39 pages.
Final Office Action regarding U.S. Appl. No. 11/771,860, dated Mar. 28, 2013, 44 pages.
Office Action regarding U.S. Appl. No. 11/771,884, dated Sep. 4, 2012, 16 pages.

(56) References Cited

OTHER PUBLICATIONS

Office Action regarding U.S. Appl. No. 11/861,966, dated Oct. 4, 2012, 68 pages.
Office Action regarding U.S. Appl. No. 11/695,983, dated Sep. 17, 2013, 76 pages.
Final Office Action regarding U.S. Appl. No. 11/695,983, dated Jan. 17, 2014, 33 pages.
Final Office Action regarding U.S. Appl. No. 11/695,983, dated Jul. 7, 2010, 23 pages.
Office Action regarding U.S. Appl. No. 11/862,279, dated Feb. 4, 2011, 29 pages.
Final Office Action regarding U.S. Appl. No. 11/862,279, dated Jul. 19, 2011, 20 pages.
U.S. Appl. No. 11/695,983, filed Apr. 3, 2007, Angell et al.

* cited by examiner

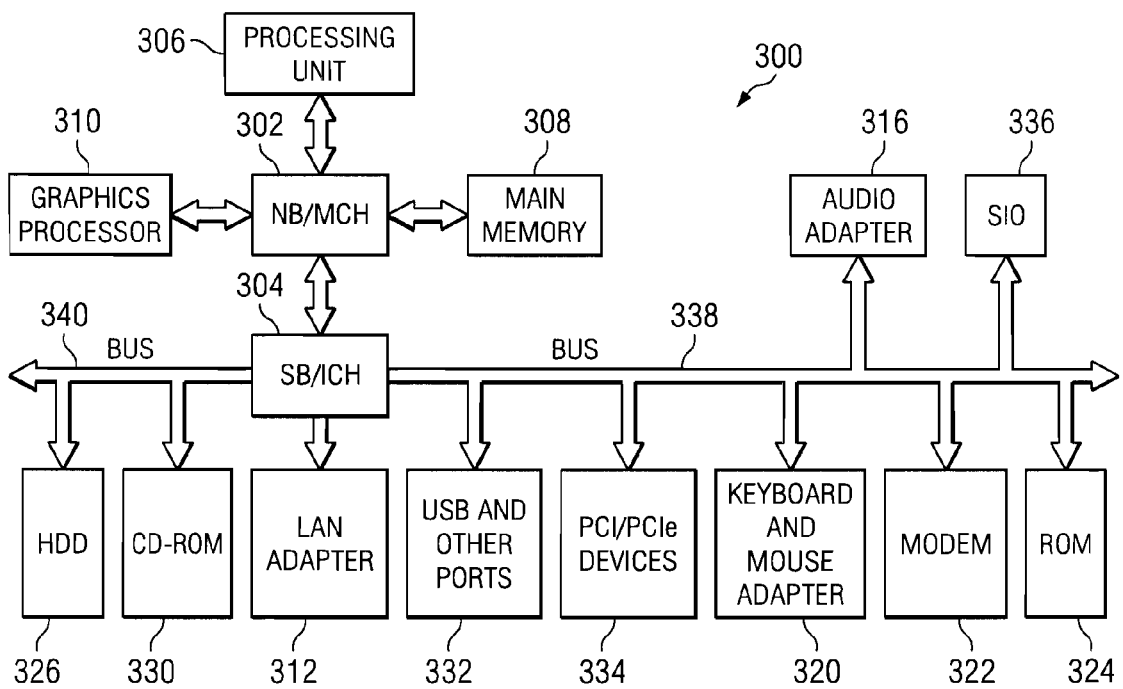
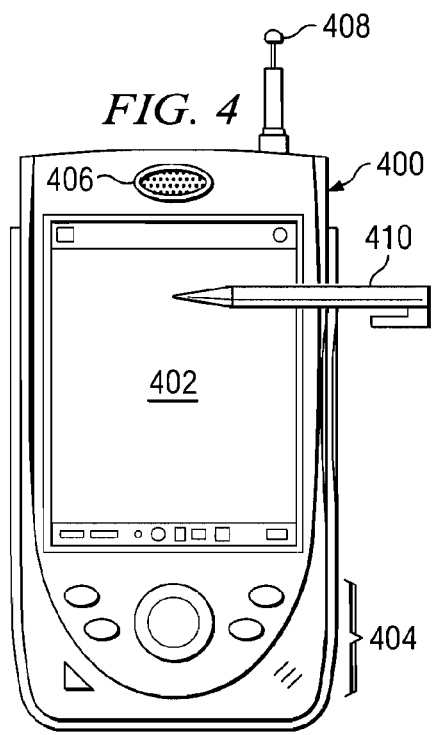
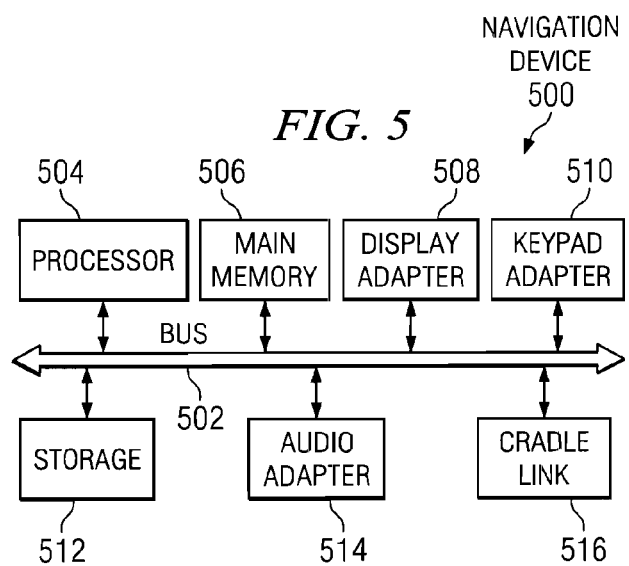

GENERATING CUSTOMIZED MARKETING MESSAGES AT THE CUSTOMER LEVEL BASED ON BIOMETRIC DATA

RELATED APPLICATIONS

This application is a continuation-in-part of U.S. patent application Ser. No. 11/695,983, filed Apr. 3, 2007, titled "Method and Apparatus for Providing Customized Digital Media Marketing Content Directly to a Customer", which is incorporated herein by reference.

The present invention is also related to the following applications entitled Retail Store Method and System, Robyn Schwartz, Publication No. US 2006/0032915 A1 (filed Aug. 12, 2004); and Business Offering Content Delivery, Robyn R. Levine, Publication No. US 2002/0111852 (filed Jan. 16, 2001) all assigned to a common assignee, and all of which are incorporated herein by reference.

BACKGROUND OF THE INVENTION

1. Field of the Invention

The present invention is related generally to an improved data processing system and in particular to a method and apparatus for processing data. More particularly, the present invention is directed to a computer implemented method, apparatus, and computer usable program code for dynamically generating customized marketing messages for a customer using biometric data associated with the customer.

2. Description of the Related Art

In the past, merchants, such as store owners and operators, frequently had a personal relationship with their customers. The merchant often knew their customers' names, address, marital status, and ages of their children, hobbies, place of employment, anniversaries, birthdays, likes, dislikes and personal preferences. The merchant was able to use this information to cater to customer needs and push sales of items the customer might be likely to purchase based on the customer's personal situation. However, with the continued growth of large cities, the corresponding disappearance of small, rural towns, and the increasing number of large, impersonal chain stores with multiple employees, the merchants and employees of retail businesses rarely recognize regular customers, and almost never know the customer's name or any other details regarding their customer's personal preferences that might assist the merchant or employee in marketing efforts directed toward a particular customer.

One solution to this problem is directed toward using profile data for a customer to generate personalized marketing messages that may be sent to the customer by email, print media, telephone, or over the World Wide Web via a web page for the merchant. Customer profile data typically includes information provided by the customer in response to a questionnaire or survey, such as name, address, telephone number, gender, and indicators of particular products the customer is interested in purchasing. Demographic data regarding a customer's age, sex, income, career, interests, hobbies, and consumer preferences may also be included in customer profile data.

In an ideal situation, an advertising computer then generates a customer advertisement based on the customer's profile. For example, one version of an advertisement may be directed to selling fruit juice to children while another version of the advertisement may be directed to selling the same fruit juice to adults. However, this method only provides a small number of pre-generated advertisements that are directed towards a fairly large segment of the population rather than to one individual. In other words, the same advertisement for selling the fruit juice to an adult may be provided to a soccer mom and to a college student, despite the fact that the soccer mom and college student have very different tastes, attitudes, preferences, financial constraints, and/or goals.

In another solution, user profile data, demographic data, point of contact data, and transaction data are analyzed to generate advertising content for customers that target the information content presented to individual consumers or users to increase the likelihood that the customer will purchase the goods or services presented. However, current solutions do not utilize all of the potential dynamic customer data elements that may be available to a retail owner or operator for generating customized marketing messages targeted to individual customers. For example, a person might be recently unemployed or have had a recent lifestyle change due to divorce or perhaps a death in the family. In addition, during the shopping experience, the customer may be calm and relaxed or agitated and upset. The customer's mood and current situation may influence the customer's receptivity to advertising messages.

Other data pieces may also be needed to provide effective dynamic one-to-one marketing messages to the potential customer. Therefore, the data elements in prior art only provides approximately seventy-five percent (75%) of the needed data to effectively customize advertising to one or more customers.

SUMMARY OF THE INVENTION

The illustrative embodiments provide a computer implemented method, apparatus, and computer usable program code for customizing marketing messages using biometric data. In one embodiment, data is received from a set of biometric devices associated with a retail facility to form the biometric data. The biometric data may be data regarding a customer's status state or data regarding a customer's physiological responses.

In one embodiment, the biometric data is obtained by detecting a change in a biometric reading associated with the customer that exceeds a threshold change and associating the change in the biometric reading with the item or the marketing message to form the biometric data if the customer was viewing an item or a marketing message when the change in the biometric reading occurred. A biometric reading may be a measurement of a customer's vital statistics over a given period of time, a measurement of a change in voice stress for the customer's voice, or a measurement of a change in a dilation of the customer's pupil. A customer's vital statistics includes at least one of a customer's heart rate, respiratory rate, and blood pressure.

The biometric data is associated with a given customer. The biometric data is processed to form dynamic data. The dynamic data is analyzed using a data model to identify personalized marketing message criteria for the customer. The dynamic data may be analyzed in a single data model or analyzed serially in a set of data models with the results of analyzing the dynamic data in a first data model being utilized as input for analysis in a next data model in the set of data models.

A customized marketing message is generated using the personalized marketing message criteria. The customized marketing message is delivered to a display device associated with the customer for display to the customer. The customized marketing message is dynamically updated in response to the biometric data associated with the customer.

In one embodiment, processing the biometric data to form the dynamic data includes processing the biometric data with any available internal data and/or external data. The set of biometric devices associated with the retail facility may include biometric devices located inside the retail facility and/or outside the retail facility. In another embodiment, biometric data may be used to dynamically identify the customer. In this example, the biometric device may be a fingerprint scanner, thumbprint scanner, palm scanner, a retina scanner, and/or a voice print scanner for obtaining biometric data to identify the customer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system in which illustrative embodiments may be implemented;

FIG. 4 is a diagram of a display device in the form of a personal digital assistant (PDA) in accordance with a preferred embodiment of the present invention;

FIG. 5 is a block diagram of a personal digital assistant display device in accordance with a preferred embodiment of the present invention;

DETAILED DESCRIPTION OF THE PREFERRED EMBODIMENT

With reference now to the figures and in particular with reference to FIGS. 1-5, exemplary diagrams of data processing environments are provided in which illustrative embodiments may be implemented. It should be appreciated that FIGS. 1-5 are only exemplary and are not intended to assert or imply any limitation with regard to the environments in which different embodiments may be implemented. Many modifications to the depicted environments may be made.

Figure 1:
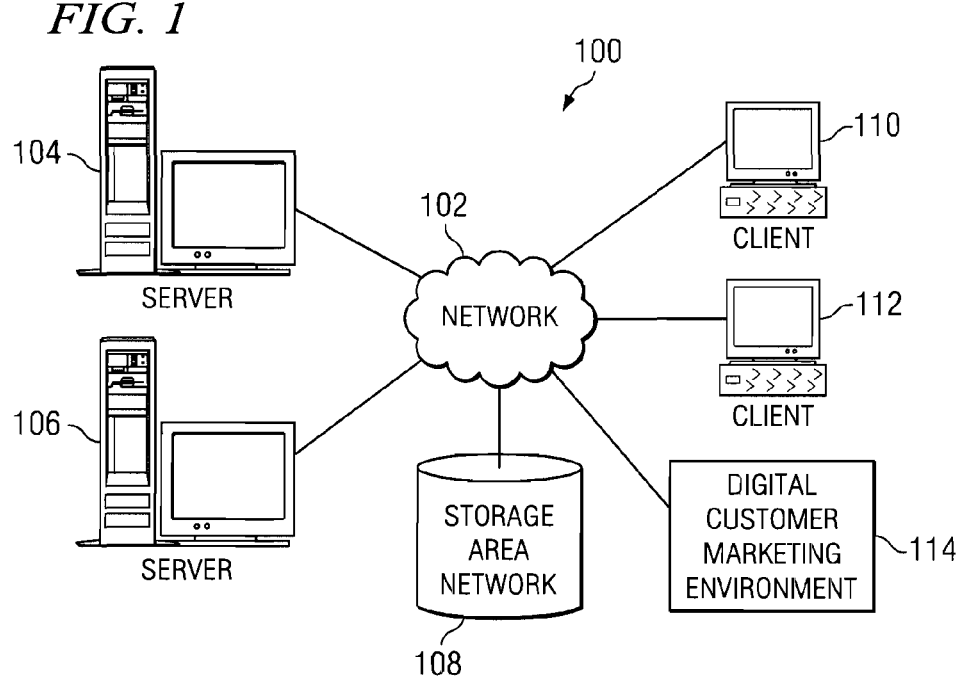
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage area network (SAN) 108. Storage area network 108 is a network connecting one or more data storage devices to one or more servers, such as servers 104 and 106. A data storage device, may include, but is not limited to, tape libraries, disk array controllers, tape drives, flash memory, a hard disk, and/or any other type of storage device for storing data. Storage area network 108 allows a computing device, such as client 110 to connect to a remote data storage device over a network for block level input/output.

In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Digital customer marketing environment 114 also connects to network 102. Digital customer marketing environment 114 is a marketing environment in which a customer may view, select order, and/or purchase one or more items. Digital customer marketing environment 114 may include one or more facilities, buildings, or other structures for wholly or partially containing the items. A facility may include, but is not limited to, a grocery store, a clothing store, a marketplace, a retail department store, a convention center, or any other type of structure for housing, storing, displaying, and/or selling items.

Items in digital customer marketing environment 114 may include, but are not limited to, comestibles, clothing, shoes, toys, cleaning products, household items, machines, any type of manufactured items, entertainment and/or educational materials, as well as entrance or admittance to attend or receive an educational or entertainment service, activity, or event. Items for purchase could also include services, such as ordering dry cleaning services, food delivery, or any other services.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible could include, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity or event could include, without limitation, the purchase of seating at a football game, purchase of a ride on a roller coaster, purchase of a manicure, or purchase of admission to view a film.

Digital customer marketing environment 114 may also include a parking facility for parking cars, trucks, motorcycles, bicycles, or other vehicles for conveying customers to and from digital customer marketing environment 114. A parking facility may include an open air parking lot, an underground parking garage, an above ground parking garage, an automated parking garage, and/or any other area designated for parking customer vehicles.

Thus, the illustrative embodiments may be implemented in digital customer marketing environment 114 which may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, and/or a zoo.

Digital customer marketing environment 114 includes one or more biometric devices for gathering biometric data associated with a customer. Biometric data is data regarding a customer's physical responses, and/or a status state of the customer. A status state of the customer refers to the customer's current or real time condition or state. For example, a status state could include data indicating a customer is angry, agitated, sleepy or fatigued, calm, relaxed, or any other state. Physical responses include data regarding the customer's physiological activity and physical traits. For example, biometric data regarding physical responses and physical traits may include, without limitation, data regarding a customer's heart rate, blood pressure rate, finger prints, voice print, voice stress, respiration, perspiration, pupil dilation, retinal pattern, body temperature, and/or any other type of data regarding a customer's physical responses or physiological traits.

Digital customer marketing environment 114 encompasses a range or area in which marketing messages may be transmitted to a digital display device for presentation to a customer within the digital customer marketing environment. Digital multimedia management software is used to manage and/or enable generation, management, transmission, and/or display of marketing messages within the digital customer marketing environment. Examples of digital multimedia management software includes, but is not limited to, Scala® digital media/digital signage software, EK3® digital media/digital signage software, and/or Allure digital media software.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, without limitation, an intranet, an Ethernet, a local area network (LAN), and/or a wide area network (WAN).

FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device. A local data storage device could include a hard disk, a flash memory, a non-volatile random access memory (NVRAM), a read only memory (ROM), and/or any other type of device for storing data.

A merchant typically wants to market the merchant's products or services to a customer or potential customer in the most convenient and efficient manner so as to maximize resulting purchases by the customer. Therefore, the aspects of the illustrative embodiments recognize that it is advantageous for the merchant to have as much information regarding a customer as possible to personalize the merchant's marketing strategy to that particular customer.

In addition, customers generally prefer to only receive marketing messages that are relevant to that particular customer. For example, a single college student with no children would typically not be interested in marketing messages offering sale prices or incentives for purchasing baby diapers or children's toys. In addition, that college student would not want to waste their time viewing such marketing messages. Likewise, a customer that is a non-smoker may be inconvenienced by being presented with advertisements, email, digital messages, or other marketing media regarding tobacco products.

Therefore, the illustrative embodiments provide a computer implemented method, apparatus, and computer usable program code for generating very specific and highly customizing marketing messages to a customer. In one embodiment of the invention, the illustrative embodiments provide a computer implemented method, apparatus, and computer usable program code for customizing marketing messages. In another embodiment of the invention, internal data is received from a set of one or more detectors located internally to a retail facility to form internal data. The internal data is processed to form dynamic data. Processing internal data may include, but is not limited to, formatting the internal data for utilization and/or analysis in one or more data models, combining the internal data with external data, comparing the internal data to a data model and/or filtering the internal data for relevant data elements to form the dynamic data.

Internal data includes biometric data. Biometric data is data gathered by one or more biometric devices located internally to a retail facility and/or externally to the retail facility. A biometric device may be located anywhere inside or outside the retail facility. For example, a biometric device may be imbedded or attached to a handle on a shopping cart, a door handle, a shelf, a floor tile or other device associated with the floor, on a wall, or anywhere else inside or outside the retail facility. A biometric device may also be attached to, imbedded within, or associated with a display device for displaying customized marketing messages to the customer.

The dynamic data is analyzed using a data model to identify and create specific and personalized marketing message criteria for the customer. The data model may be generated using any type of modeling method or simulation including, but not limited to, a statistical method, a data mining method, a causal model, a mathematical model, a marketing model, a behavioral model, a psychological model, a sociological model, or a simulation model.

A customized marketing message is generated using the personalized marketing message criteria. The personalized marketing message criteria may include one or more criterion. The personalized marketing message criteria may be implemented a prior or pre-generated based on external and/or internal data associated with a customer. The personalized marketing message is a highly customized personalized marketing message that may include incentives to the customer. An incentive is an offer of a discount or reward to encourage a customer to select, order, and/or purchase one or more items.

As used herein, data associated with a customer may include data regarding the customer, the customer's family, pets, cars or other vehicles, and/or any other data pertaining to the customer. The customized marketing message is delivered to a display device associated with the customer for display.

The display device may be, without limitation, a kiosk, a personal digital assistant, a cellular telephone, a laptop computer, a display screen, an electronic sign or a smart watch. In another embodiment, the display device is located externally to the retail facility. The customized marketing message is displayed on the display device to the customer before the customer enters the retail facility. In another embodiment, the customized marketing message is displayed to the customer after the customer enters the retail facility and begins shopping.

External customer data may include data captured by a set of motion detectors, sound detection devices, pressure sensors, or cameras. As used herein, the term "set" includes one or more. For example, a set of motion detectors may include a single motion detector or two or more motion detectors. In one embodiment, the detectors include a set of one or more cameras located externally to the retail facility. Camera images received from the set of cameras are used to identify a presence of the customer outside the retail facility.

A marketing message is a message that presents a message regarding a product or item that is being marketed, advertised, promoted, and/or offered for sale. A marketing message may include, but is not limited to, marketing messages displayed on a digital display device, marketing messages printed on a paper medium by a printing device, or marketing messages presented to the customer as an audio message generated by a speaker or other audio generation device.

A marketing message may include textual content, graphical content, moving video content, still images, audio content, and/or any combination of textual, graphical, moving video, still images, and audio content. A customized marketing message is a marketing message that is generated for a particular customer or group of customers based on one or more personalized message criteria for the customer.

Figure 2:
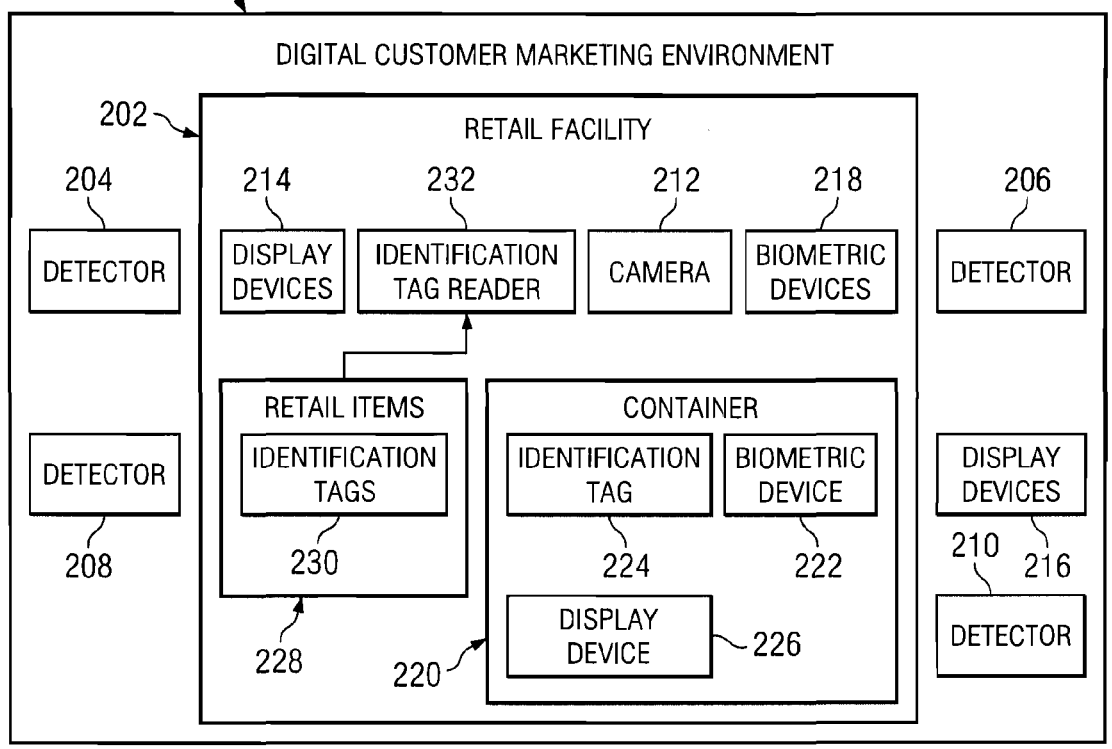
FIG. 2 is a block diagram of a digital customer marketing environment in which illustrative embodiments may be implemented.

FIG. 2 is a block diagram of a digital customer marketing environment in which illustrative embodiments may be implemented. Digital customer marketing environment 200 is a marketing environment, such as digital customer marketing environment 114 in FIG. 1.

Retail facility 202 is a retail facility for wholly or partially storing, enclosing, or displaying items for viewing, selection, order, and/or purchase. For example, retail facility 202 may be, without limitation, a retail store, supermarket, book store, or shopping mall. However, retail facility 202 is not limited to retail stores. For example, retail facility 202 may also be, without limitation, a sports arena, amusement park, water park, or convention center. In this example, retail facility 202 is a grocery store.

Detectors 204-210 are devices for detecting the presence of a customer outside of retail facility but within digital customer marketing environment 200. These detectors are examples of detectors that are located externally to retail facility 202. In this example, detectors 204-210 are located at locations along an outer perimeter of digital customer marketing environment 200. However, detectors 204-210 may be located at any position within digital customer marketing environment 200 that is outside retail facility 202 to detect customers before the customers enter retail facility 202 and/or after customers leave digital customer marketing environment 200.

Detectors 204-210 may be any type of detecting devices, including, but not limited to, a camera, a motion sensor device, a sonar, sound, or audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, animal, and/or conveyance vehicle outside of the retail facility. A conveyance vehicle is a vehicle for conveying people, animals, or objects to a destination. A conveyance vehicle may include, but is not limited to, a car, bus, truck, motorcycle, boat, airplane, or any other type of vehicle.

External customer data may include data gathered by a camera, an audio or sound detection device, a seismograph, pressure sensors, a device for detecting odors, scents, and/or fragrances, a motion detector, a thermal sensor or other heat sensor device, and/or any other device for detecting a presence of a human, animal, and/or conveyance vehicle outside of the retail facility.

A heat sensor may be any type of known or available sensor for detecting body heat generated by a human or animal. A heat sensor may also be a sensor for detecting heat generated by a vehicle, such as an automobile or a motorcycle.

A motion detector may include any type of known or available motion detector device. A motion detector device may include, but is not limited to, a motion detector device using a photo-sensor, radar or microwave radio detector, or ultrasonic sound waves.

A motion detector using ultrasonic sound waves transmits or emits ultrasonic sounds waves. The motion detector detects or measures the ultrasonic sound waves that are reflected back to the motion detector. If a human, animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, animal, or other object moves into the range of the microwave radio energy field generated by the motion detector, the amount of energy reflected back to the motion detector is changed. The motion detector identifies this change in reflected energy as an indication of the presence of a human, animal, or other object moving within the motion detectors range.

A motion detector device, using a photo-sensor, detects motion by sending a beam of light across a space into a photo-sensor. The photo-sensor detects when a human, animal, or object breaks or interrupts the beam of light as the human, animal, or object by moving in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or floor mat, the pressure sensor detects a change in weight or mass when a human customer or animal steps on the pressure sensor. The pressure sensor may also detect when a human customer or animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with image capture device to assist in capturing the desired view. Device 12 may be fixed in a particular orientation and configuration, or it may, along with any optical devices, be programmable in orientation, light sensitivity level, focus or other parameters. Programming data may be provided via a computing device, such as server 104 in FIG. 1.

A camera may also be a stationary camera and/or non-stationary cameras. A non-stationary camera is a camera that is capable of moving and/or rotating along one or more directions, such as up, down, left, right, and/or rotate about an axis of rotation. The camera may also be capable of moving to follow or track a person, animal, or object in motion. In other words, the camera may be capable of moving about an axis of rotation in order to keep a customer, animal, or object within a viewing range of the camera lens. In this example, detectors 204-210 are non-stationary digital video cameras.

Detectors 204-210 are connected to an analysis server on a data processing system, such as network data processing system 100 in FIG. 1. The analysis server is illustrated and described in greater detail in FIG. 6 below. The analysis server includes software for analyzing digital images and other data captured by detectors 204-210 to track and/or visually identify retail items, containers, and/or customers outside retail facility 202. Attachment of identifying marks may be part of this visual identification in the illustrative embodiments.

In this example, four detectors, detectors 204-210, are located outside retail facility 202. However, any number of detectors may be used to detect, track, and/or gather data associated with customers outside retail facility 202. For example, a single detector, as well as two or more detectors may be used outside retail facility 202 for tracking customers entering and/or exiting retail facility 202.

Retail facility 202 may also optionally include set of detectors 212. Set of detectors 212 is a set of one or more detectors for gathering data associated with a customer located inside of retail facility 202. The one or more detectors in set of detectors 212 may be located at any location within retail facility 202. The detectors in set of detectors 212 may be any type of detecting devices, including, but not limited to, a camera, a motion sensor device, a sonar, sound, or audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, animal, and/or conveyance vehicle inside of retail facility 202.

For example, set of detectors 212 may include one or more cameras or other image capture devices located inside retail facility 202 for tracking and/or identifying items, containers for items, shopping containers and shopping carts, and/or customers inside retail facility 202. The camera or other detector in set of detectors 212 may be coupled to and/or in communication with the analysis server. In addition, more than one image capture device may be operated simultaneously without departing from the illustrative embodiments of the present invention.

Display devices 214 are multimedia devices for displaying marketing messages to customers. Display devices 214 may be any type of display device for presenting a text, graphic, audio, video, and/or any combination of text, graphics, audio, and video to a customer. For example, display devices 214 may be, without limitation, a computer display screen, laptop computer, a tablet personal computer (PC), a video display screen, a digital message board, a monitor, a kiosk, a personal digital assistant (PDA), and/or a cellular telephone with a display screen. Display devices 214 may be one or more display devices located within retail facility 202 for use and/or viewing by one or more customers.

In this example, display devices 214 are located inside retail facility 202. However, display devices 214 may also be located outside retail facility, such as display devices 216. In this example, display devices 216 is a display screen or kiosk located in a parking lot, queue line, or other area outside of retail facility 202. Display devices 216 outside retail facility 202 may be used in the absence of display devices 214 inside retail facility 202, or in addition to display devices 214 located inside retail facility 202.

Biometric devices 218 include one or more devices for measuring and/or detecting a change in biometric readings of a customer that exceeds a threshold or baseline change in biometric readings. Biometric readings may include a measurement of a customer's heart rate over a given period of time, blood pressure, voice stress, pupil dilation, fingerprint data, respiration, and/or an amount of perspiration. If biometric devices 218 measures a change in biometric readings for a customer that exceeds a predefined threshold change that corresponds to a customer viewing an item and/or a marketing message, the change in the customer's biometric readings may be attributed to the item and/or the marketing message.

Container 220 is a container for holding, carrying, transporting, or moving one or more items. For example, container 220 may be, without limitation, a shopping cart, a shopping bag, a shopping basket, and/or any other type of container for holding items. In this example, container 220 is a shopping cart.

In this example in FIG. 2, only one container 220 is depicted inside retail facility 202. However, any number of containers may be used inside and/or outside retail facility 202 for holding, carrying, transporting, or moving items selected by customers.

Container 220 may optionally include biometric device 222. Biometric device 222 is a biometric device attached to or installed on container 222. Biometric device 222 is a device for gathering biometric data, such as biometric devices 218. For example, biometric device 222 may be a device for measuring a customer's heart rate that is attached to or imbedded within a handle on a shopping cart. Biometric device 222 may also be a device attached, coupled to, or associated with any other part or member of a shopping cart or other shopping container.

Container 220 may also optionally include identification tag 224. Identification tag 224 is a tag for identifying container 220, locating container 220 within digital customer marketing environment 200, either inside or outside retail facility 202, and/or associating container 220 with a particular customer. For example, identification tag 224 may be a radio frequency identification (RFID) tag, a Universal Product Code (UPC) tag, a global positioning system (GPS) tag, and/or any other type of identification tag for identifying, locating, and/or tracking a container.

Container 220 may also include display device 226 coupled to, mounted on, attached to, or imbedded within container 220. Display device 226 is a multimedia display device for displaying textual, graphical, video, and/or audio marketing messages to a customer. For example, display device 226 may be a digital display screen or personal digital assistant attached to a handle, front, back, or side member of container 220. Display device 226 may be operatively connected to a data processing system, such as data processing system 100 connected to digital customer marketing environment 114 in FIG. 1 via wireless, infrared, radio, or other connection technologies known in the art, for the purpose of transferring data to be displayed on display device 226. The data processing system includes the analysis server for analyzing dynamic external customer data obtained from detectors 204-210 and set of detectors 212, as well as internal customer data obtained from one or more databases storing data associated with one or more customers.

Retail items 228 are items of merchandise for sale. Retail items 228 may be displayed on a display shelf (not shown) located in retail facility 202. Other items of merchandise that may be for sale, such as food, beverages, shoes, clothing, household goods, decorative items, or sporting goods, may be hung from display racks, displayed in cabinets, on shelves, or in refrigeration units (not shown). Any other type of merchandise display arrangement known in the retail trade may also be used in accordance with the illustrative embodiments.

For example, display shelves or racks may include, in addition to retail items 228, various advertising displays, images, or postings. A multimedia display device attached to a data processing system may also be included. The images shown on the multimedia display may be changed in real time in response to various events such as the time of day, the day of the week, a particular customer approaching the shelves or rack, or items already placed inside container 220 by the customer.

Retail items 228 may be viewed or identified using an image capture device, such as a camera or other detector in set of detectors 212. To facilitate such viewing, an item may have attached identification tags 230. Identification tags 230 are tags associated with one or more retail items for identifying the item and/or location of the item. For example, identification tags 230 may be, without limitation, a bar code pattern, such as a universal product code (UPC) or European article number (EAN), a radio frequency identification (RFID) tag, or other optical identification tag, depending on the capabilities of the image capture device and associated data processing system to process the information and make an identification of retail items 228. In some embodiments, an optical identification may be attached to more than one side of a given item.

The data processing system, shown in FIG. 3 below, includes associated memory which may be an integral part, such as the operating memory, of the data processing system or externally accessible memory. Software for tracking objects may reside in the memory and run on the processor. The software is capable of tracking retail items 228, as a customer removes an item in retail items 228 from its display position and places the item into container 220. Likewise, the tracking software can track items which are being removed from container 220 and placed elsewhere in the retail store, whether placed back in their original display position or anywhere else including into another container. The tracking software can also track the position of container 220 and the customer.

The software can track retail items 228 by using data from one or more of detectors 204-210 located externally to retail facility, internal data captured by one or more detectors in set of detectors 212 located internally to retail facility 202, identification data received from identification tags 230 and/or identification data received from identification tags 224.

The software in the data processing system keeps a list of which items have been placed in each shopping container, such as container 220. The list is stored in a database. The database may be any type of database such as a spreadsheet, relational database, hierarchical database or the like. The database may be stored in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

The lists of items in container 220 are updated frequently enough to maintain a dynamic, accurate, real time listing of the contents of each container as customers add and remove items from containers, such as container 220. The listings of items in containers are also made available to whatever inventory system is used in retail facility 202. Such listings represent an up-to-the-minute view of which items are still available for sale, for example, to on-line shopping customers. The listings may also provide a demand side trigger back to the supplier of each item. In other words, the listing of items in customer shopping containers can be used to update inventories to determine current stock available for sale to customers and/or identification of items that need to be restocked or replenished.

At any time, the customer using container 220 may request to see a listing of the contents of container 220 by entering a query at a user interface to the data processing system. The user interface may be available at a kiosk, computer, personal digital assistant, or other computing device connected to the data processing system via a network connection. The user interface may also be coupled to a display device, such as at a display device in display devices 214, display devices 216, or display device 226 associated with container 220. The customer may also make such a query after leaving the retail store. For example, a query may be made using a portable device or a home computer workstation.

The listing is then displayed at a location where it may be viewed by the customer, such as on a display device in display devices 214 inside retail facility 202, display devices 216 outside retail facility 202, or display device 226 associated with container 220. The listing may include the quantity of each item in container 220 as well as the price for each, a discount or amount saved off the regular price of each item, and a total price for all items in container 220. Other data may also be displayed as part of the listing, such as, additional incentives to purchase one or more other items available in digital customer marketing environment 200.

In addition, the analysis server in the data processing system includes software to monitor for changes in the customer's biometric readings that exceed a threshold or baseline change in biometric readings. The analysis server is capable of analyzing the biometric data to identify a change in biometric data associated with an item in retail items 228 and/or a marketing message being viewed when the change in biometric readings occurred. In this manner, the analysis server can track a customer's responses to items and marketing messages being viewed by the customer. The customer's responses may indicate whether a customer's reaction is favorable, interested, disinterested, or hostile to the marketing message, the item being viewed, and/or the marketing environment.

When the customer is finished shopping, the customer may proceed to a point-of-sale checkout station. In one embodiment, the checkout station may be coupled to the data processing system. Therefore, the items in container 220 are already known to the data processing system due to the dynamic listing of items in container 220 that is maintained as the customer shops in digital customer marketing environment 200. Thus, no need is present for an employee, customer, or other person to scan each item in container 220 to complete the purchase of each item as is commonly done today. In this example, the customer merely arranges for payment of the total, for example by use of a smart card, credit card, debit card, cash, or other payment method. In some embodiments, it may not be necessary to empty container 220 at the retail facility at all, for example, if container 220 is a minimal cost item which can be kept by the customer.

In other embodiments, container 220 may belong to the customer. In this example, the customer brings container 220 to retail facility 202 at the start of the shopping session. In another embodiment, container 220 belongs to retail facility 202 and must be returned before the customer leaves the parking lot or at some other designated time or place.

In another example, when the customer is finished shopping, the customer may complete checkout either in-aisle or from a final or terminal-based checkout position in the store using a transactional device which may be integral with container 220 or associated temporarily to container 220. The customer may also complete the transaction using a consumer owned computing device, such as a laptop, cellular telephone, or personal digital assistant that is connected to the data processing system via a network connection.

The customer may also make payment by swiping a magnetic strip on a card, using a radio frequency identification (RFID) enabled payment device with the transactional device, using any biometric type of payment tender via biometric device 218 and/or biometric device 222 known in the art, and/or via any other known or available method for making a payment or concluding a transaction.

The transactional device may also be a portable device such as a laptop computer, palm device, or any other portable device specially configured for such in-aisle checkout service, whether integral with container 220 or separately operable. In this example, the transactional device connects to the data processing system via a network connection to complete the purchase transaction at checkout time. Checkout may be performed in-aisle or at the end of the shopping trip whether from any point or from a specified point of transaction. As noted above, checkout transactional devices may be stationary shared devices or portable or mobile devices offered to the customer from the store or may be devices brought to the store by the customer, which are compatible with the data processing system and software residing on the data processing system.

Thus, in this depicted example, when a customer enters digital customer marketing environment but before the customer enters retail facility 202, such as a retail store, the customer is detected and identified by one or more detectors in detectors 204-210. If the customer takes a shopping container before entering retail facility 202, the shopping container is also identified. In some embodiments, the customer may be identified through identification of the container.

The customer is tracked using image data and/or other detection data captured by detectors 204-210 as the customer enters retail facility 202. The customer is identified and tracked inside retail facility 202 by one or more detectors inside the facility, such as set of detectors 212. When the customer takes a shopping container, such as container 220, the analysis server uses internal data from set of detectors 212, identification data from identification tags 230 and 224 to track container 220 and items selected by the customer and placed in container 220.

As a result, an item selected by the customer, for example, as the customer removes the item from its stationary position on a store display, is identified. The selected item may be traced visually by a camera, tracked by another type of detector in set of detectors 212 and/or using identification data from identification tags 230. The item is tracked until the customer places it in container 220.

The analysis server stores a listing of selected items placed in the shopping container. In this example, a single container and a single customer is described. However, the aspects of the illustrative embodiments may also be used to track multiple containers and multiple customers simultaneously. In this case, the analysis server will store a separate listing of selected items for each active customer. As noted above, the listings may be stored in a database. The listing of items in a given container is displayed to a customer, employee, agent, or other customer in response to a query. The listing may be displayed to a customer at any time either while actively shopping, during check-out, or after the customer leaves retail facility 202.

Thus, in one embodiment, a customer entering retail facility 202 is detected by one or more detectors in detectors 204-210. The customer may be identified by the one or more detectors. An analysis server in a data processing system associated with retail facility 202 begins performing data mining on available customer profile information and demographic information for use in generating customized marketing messages targeted to the customer.

The customer may be presented with customized digital marketing messages on one or more display devices in display devices 216 located externally to retail facility 202 before the customer enters retail facility 202.

When the customer enters retail facility 202, the customer is typically offered, provided, or permitted to take shopping container 220 for use during shopping. Container 220 may contain a digital media display, such as display device 226, mounted on container 220 and/or customer may be offered a handheld digital media display device, such as a display device in display devices 214. In the alternative, the customer may be encouraged to use strategically placed kiosks running digital media marketing messages throughout retail facility 202. Display device 226, 214, and/or 216 may include a verification device for verifying an identity of the customer. For example, display device 214 may include a radio frequency identification tag reader 232 for reading a radio frequency identification tag, a smart card reader for reading a smart card, or a card reader for reading a specialized store loyalty or frequent customer card. Once the customer has been verified, the data processing system retrieves past purchase history, total potential wallet-share, shopper segmentation information, customer profile data, granular demographic data for the customer, and/or any other available customer data elements using known or available data retrieval and/or data mining techniques. The customer data elements are analyzed using a data model to determine appropriate digital media content to be pushed, on-demand, throughout the store to customers viewing display devices 214, 216, and/or display device 226.

This illustrative embodiment provides an intelligent guided selling methodology to optimize customer throughput in the store, thereby maximizing or optimizing total retail content and/or retail sales for the store. It will be appreciated by one skilled in the art that the words "optimize", "optimizating" and related terms are terms of art that refer to improvements in speed and/or efficiency of a computer implemented method or computer program, and do not purport to indicate that a computer implemented method or computer program has achieved, or is capable of achieving, an "optimal" or perfectly speedy/perfectly efficient state.

Thus, the customer is provided with incentives to use display devices 214, 216, and/or display device 226 to obtain marketing incentives, promotional offers, and discounts. When the customer has finished shopping, the customer may be provided with a list of savings or "tiered" accounting of savings over the regular price of purchased items if a display device had not been used to view and use customized digital marketing messages.

Next, FIG. 3 is a block diagram of a data processing system in which illustrative embodiments may be implemented. Data processing system 300 is an example of a computer, such as server 104 or client 110 in FIG. 1, in which computer usable code or instructions implementing the processes may be located for the illustrative embodiments.

In the depicted example, data processing system 300 employs a hub architecture including a north bridge and memory controller hub (MCH) 302 and a south bridge and input/output (I/O) controller hub (ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or customer-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs.

With reference now to FIG. 4, a diagram of a display device in the form of a personal digital assistant (PDA) is depicted in accordance with a preferred embodiment of the present invention. Personal digital assistant 400 includes a display screen 402 for presenting textual and graphical information. Display screen 402 may be a known display device, such as a liquid crystal display (LCD) device. The display may be used to present a map or directions, calendar information, a telephone directory, or an electronic mail message. In these examples, display screen 402 may receive customer input using an input device such as, for example, stylus 410.

Personal digital assistant 400 may also include keypad 404, speaker 406, and antenna 408. Keypad 404 may be used to receive customer input in addition to using display screen 402. Speaker 406 provides a mechanism for audio output, such as presentation of an audio file. Antenna 408 provides a mechanism used in establishing a wireless communications link between personal digital assistant 400 and a network, such as network 102 in FIG. 1.

Personal digital assistant 400 also preferably includes a graphical user interface that may be implemented by means of systems software residing in computer readable media in operation within personal digital assistant 400.

Turning now to FIG. 5, a block diagram of a personal digital assistant display device is shown in accordance with a preferred embodiment of the present invention. Personal digital assistant 500 is an example of a personal digital assistant, such as personal digital assistant 400 in FIG. 4, in which code or instructions implementing the processes of the present invention for displaying customized digital marketing messages may be located. Personal digital assistant 500 includes a bus 502 to which processor 504 and main memory 506 are connected. Display adapter 508, keypad adapter 510, storage 512, and audio adapter 514 also are connected to bus 502. Cradle link 516 provides a mechanism to connect personal digital assistant 500 to a cradle used in synchronizing data in personal digital assistant 500 with another data processing system. Further, display adapter 508 also includes a mechanism to receive customer input from a stylus when a touch screen display is employed.

An operating system runs on processor 504 and is used to coordinate and provide control of various components within personal digital assistant 500 in FIG. 5. The operating system may be, for example, a commercially available operating system such as Windows CE, which is available from Microsoft Corporation. Instructions for the operating system and applications or programs are located on storage devices, such as storage 512, and may be loaded into main memory 506 for execution by processor 504.

The depicted examples in FIGS. 1-5 are not meant to imply architectural limitations. The hardware in FIGS. 1-5 may vary depending on the implementation. Other internal hardware or peripheral devices, such as flash memory, equivalent non-volatile memory, or optical disk drives and the like, may be used in addition to or in place of the hardware depicted in FIGS. 1-5. Also, the processes of the illustrative embodiments may be applied to a multiprocessor data processing system.

Figure 6:
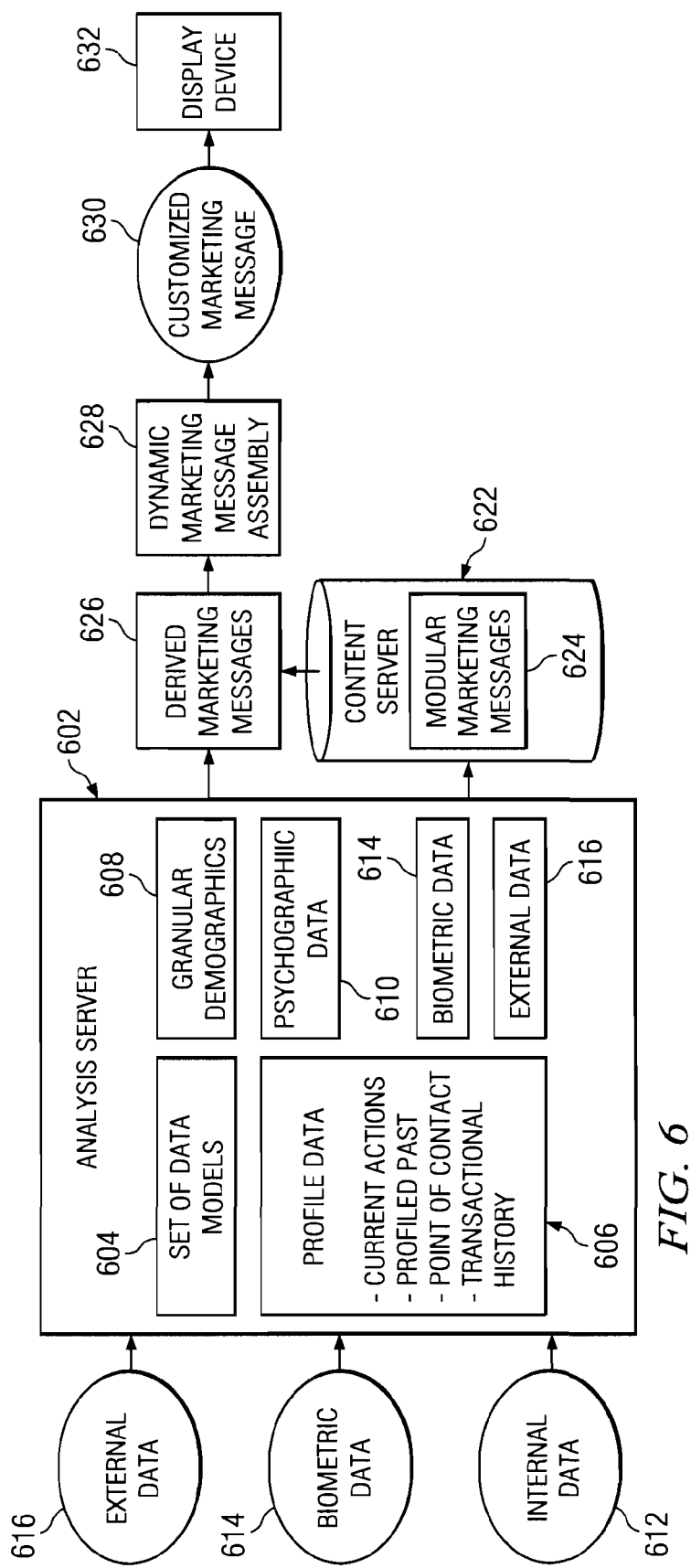
FIG. 6 is a block diagram of a data processing system for analyzing internal customer data and external customer data to generate customized marketing messages in accordance with an illustrative embodiment.

Referring now to FIG. 6, a block diagram of a data processing system for analyzing internal customer data and external customer data to generate customized marketing messages is shown in accordance with an illustrative embodiment. Data processing system 600 is a data processing system, such as data processing system 100 in FIG. 1 and/or data processing system 300 in FIG. 3.

Analysis server 602 is any type of known or available server for analyzing dynamic customer data elements for use in generating customized digital marketing messages. Analysis server 602 may be a server, such as server 104 in FIG. 1 or data processing system 300 in FIG. 3. Analysis server 602 includes set of data models 604 for analyzing dynamic customer data elements and static customer data elements.

Analysis server 602 uses entity analytics to determine if a customer is a good/desirable customer or an undesirable customer. Analysis server 602 performs a risk assessment analysis of the customer to generate a risk assessment score. The risk assessment score indicates the customer's potential risk to the store, such as, for example, shoplifting, failure to pay bills, or other risks. Analysis server 602 may user the customer's current credit score to determine a degree of risk or risk assessment for the customer.

Dynamic customer data elements are data elements that are changing in real-time. For example, dynamic customer data elements could include, without limitation, the contents of a customer's shopping basket, the time of day, the day of the week, whether it is the customer's birthday or other holiday observed by the customer, customer's responses to marketing messages and/or items viewed by the customer, customer and item locations, and/or any other dynamic customer information.

Set of data models 604 is one or more data models created a priori or pre-generated for use in analyzing customer data objects for personalizing content of marketing messages presented to the customer. Set of data models 604 includes one or more data models for identifying customer data objects and determining relationships between the customer data objects. Set of data models 604 are generated using statistical, data mining, and simulation or modeling techniques.

Profile data 606 is data regarding one or more customers. Profile data 606 includes point of contact data, profiled past data, current actions data, transactional history data, transactional history data, certain click-stream data, granular demographics 608, psychographic data 610, registration e.g. customer provided data, and account data and/or any other data regarding a customer.

Point of contact data is data regarding a method or device used by a customer to interact with a data processing system of a merchant or supplier and/or receive customized marketing message 630 for display. The customer may interact with the merchant or supplier using a computing device or display terminal having a user interface for inputting data and/or receiving output. The device or terminal may be a device provided by the retail facility and/or a device belonging to or provided by the customer. For example, the display or access device may include, but is not limited to, a cellular telephone, a laptop computer, a desktop computer, a computer terminal kiosk, personal digital assistant (PDA) such as a personal digital assistant 400 in FIG. 4 or personal digital assistant 500 in FIG. 5 or any other display or access device, such as display device 632.

If display device 632 is a display device associated with the retail facility, details and information regarding display device 632 will be known to analysis server 602. However, if display device 632 is a display device belonging to the customer or brought to the retail facility by the customer, analysis server 602 may identify the type of display device using techniques such as interrogation commands, cookies, or any other known or equivalent technique. From the type of device other constraints may be determined such as display size, resolution, refresh rate, color capability, keyboard entry capability, other entry capability such as pointer or mouse, speech recognition and response, language constraints, and any other fingertip touch point constraints and assumptions about customer state of the display device. For example someone using a cellular phone has a limited time window and is sensitive to location and local time of day, whereas a casual home browser may have a greater luxury of time and faster connectivity.

An indication of a location for the point of contact may also be determined. For example, global positioning system (GPS) coordinates of the customer may be determined if the customer device has such a capability whether by including a real time global positioning system receiver or by periodically storing global positioning system coordinates entered by some other method. Other location indications may also be determined such as post office address, street or crossroad coordinates, latitude-longitude coordinates or any other location indicating system.

The connectivity may also be determined. For example the customer may be connected to the merchant or supplier in any of a number ways such as a modem, digital modem, network, wireless network, Ethernet, intranet, or high speed lines including fiber optic lines. Each way of connection imposes constraints of speed, latency, mobility which can then also be determined.

The profiled past comprises data for individualization of customized marketing message 630. Global profile data may be retrieved from a file, database, data warehouse or any other data storage device. Multiple storage devices and software may also be used. Some or all of the data may be retrieved from the point of contact device, as well. The profiled past may comprise an imposed profile, global profile, individual profile, and demographic profile. The profiles may be combined or layered to define the customer for specific promotions and marketing offers.

In the illustrative embodiments, a global profile includes data on the customer's interests, preferences, and affiliation. The profiled past may also comprise retrieving purchased data. Various firms provide data for purchase which is grouped or keyed to presenting a lifestyle or life stage view of customers by block or group or some other baseline parameter. The purchased data presents a view of the customer based on aggregation of data points such as, but not limited to geographic block, age of head of household, income level, number of children, education level, ethnicity, and buying patterns.

The profiled past may also include navigational data relating to the path the customer used to arrive at a web page which indicates where the customer came from or the path the customer followed to link to the merchant or supplier's web page. Transactional data of actions taken is data regarding a transaction. For example, transaction data may include data regarding whether the transaction is a first time transaction or a repeat transaction, and/or how much the customer usually spends. Information on how much a customer generally spends during a given transaction may be referred to as basket share. Data voluntarily submitted by the customer in responding to questions or a survey may also be included in the profiled past.

Current actions, also called a current and historical record, are also included in profile data 606. Current actions are data defining customer behavior. One source of current actions is listings of the purchases made by the customer, payments and returns made by the customer, and/or click-stream data from a point of contact device of the customer. Click-stream data is data regarding a customer's navigation of an online web page of the merchant or supplier. Click-stream data may include page hits, sequence of hits, duration of page views, response to advertisements, transactions made, and conversion rates. Conversion rate is the number of times the customer takes action divided by the number of times an opportunity is presented.

In this example, profiled past data for a given customer is stored in analysis server 602. However, in accordance with the illustrative embodiments, profiled past data may also be stored in any local or remote data storage device, including, but not limited to, a device such as storage area network 108 in FIG. 1 or read only memory (ROM) 324 and/or compact disk read only memory (CD-ROM) 330 in FIG. 3.

Granular demographics 608 include data associated with a detailed demographics profile for one or more customers. Granular demographics 608 may include, without limitation, ethnicity, block group, lifestyle, life stage, income, and education data. Granular demographics 608 may be used as an additional layer of profile data 602 associated with a customer.

Psychographic data 610 refers to an attitude profile of the customer. Examples of attitude profiles include a trend buyer, or a time-strapped person who prefers to purchase a complete outfit, or a professional buyer who prefers to mix and match individual items from various suppliers.

Internal data 612 is data associated with a customer that is pre-generated and/or data that is gathered inside a retail facility. For example, internal data may include data received from a set of detectors (not shown) located internally or inside of a retail facility. The set of detectors located inside the retail facility are detectors for gathering data associated with a customer, such as detectors 212 in FIG. 2, located internally to the retail facility. For example, internal data 612 may include customer profile 606 data, granular demographics 608 data, psychographic data 610, point of contact data, transactional history data, current actions data, items currently in the customer's shopping cart, and/or profiled past data.

Biometric data 614 is data regarding a customer's physical responses. For example, biometric data may include data regarding a customer's heart rate over a period of time, a fingerprint, a retinal pattern, a voice stress measurement, a measurement of a change in pupil dilation as compared to changes in the ambient light levels, body temperature, rate or amount of perspiration, respiratory rate, and/or any other measurement of a customer's physical traits or physical responses.

Biometric data 614 may be used to determine a customer's response to an item or marketing message being viewed by a customer at the time a change in a biometric reading takes place. For example, if a customer's heart rate or pupil dilation changes while viewing a marketing message, the change in the heart rate or pupil dilation may be attributed to the marketing message.

Biometric data such as, without limitation, fingerprint scans, retinal scans, and voice print analysis may also be used to dynamically identify a customer while the customer is outside the retail marketing facility, as well as after the customer has entered or is inside the retail marketing facility. For example, a fingerprint scanner on a shopping container or a display device may be used to determine or verify a customer's identity.

Biometric data 614 is gathered or captured by a set of biometric devices, such as biometric device 222 and 218 in FIG. 2. The set of biometric devices includes one or more biometric devices located within a retail environment, such as digital customer marketing environment 200 in FIG. 2. The biometric devices in a set of biometric devices may be located inside a retail facility and/or outside a retail facility. For example, a biometric device may be located on a shopping cart that is temporarily located outside the retail facility. The shopping cart may be moved outside by a customer leaving the store. The shopping cart may also be found by a customer arriving at the retail facility. In this case, the customer may select the shopping cart located outside the retail facility and take the cart inside the store as the customer enters the retail facility.

External data 616 is data gathered by one or more detection devices located externally to a retail facility, such as retail facility 202 in FIG. 2. The one or more detection devices may be any type of detection devices for detecting a presence of a customer, animal, or object outside of the retail facility, including, but not limited to, one or more cameras, radio frequency identification tag readers, motion detectors, devices for detecting sound or audio, and/or pressure sensor devices. For example, the detection devices may be detectors such as detectors 204-210 in FIG. 2.

External data 616 may include data regarding detection of a customer's presence outside a retail facility, a detection of a customer outside the retail facility that is moving toward an entrance to the retail facility indicating that the customer is about to go inside the facility, and/or detection of a customer exiting the retail facility. External data 616 may also indicate detection of a customer's vehicle, such as a car, bicycle, motorcycle, bus, or truck.

Biometric data 614 is processed with any available internal data 612 and/or external data 616 to form dynamic data. The dynamic data is processed and/or analyzed in one or more data models in a set of data models 604. Processing biometric data 614 with any available internal data 612, and/or external data 616 may include, but is not limited to, filtering biometric data 614 for relevant data elements, combining biometric data 614 with any available internal data 612, and/or external data 616, comparing biometric data 614 to baseline data or comparison models for biometric data 614, and/or formatting biometric data 614 for utilization and/or analysis in one or more data models in set of data models 604 to form the dynamic data.

Content server 622 is any type of known or available server for storing modular marketing messages 624. Content server 622 may be a server, such as server 104 in FIG. 1 or data processing system 300 in FIG. 3.

Modular marketing messages 624 are two or more self contained marketing messages that may be combined with one or more other modular marketing messages in modular marketing messages 624 to form a customized marketing message for display to the customer. Modular marketing messages 624 can be quickly and dynamically assembled and disseminated to the customer in real-time.

In this illustrative example, modular marketing messages 624 are pre-generated. In other words, modular marketing messages 624 are preexisting modular marketing messages that are created prior to analyzing internal data and external data associated with a customer using one or more data models to generate a personalized marketing message for the customer. The pre-existing modular marketing messages are used to dynamically generate customized marketing message 630.

Derived marketing messages 626 is a device for determining which modular marketing messages in modular marketing messages 624 should be combined or utilized to dynamically generate customized marketing message 630 for the customer in real time. Derived marketing messages 626 uses the output generated by analysis server 602 as a result of analyzing biometric data 614, external data 614 and internal data 612 using one or more appropriate data models in set of data models 604 to identify one or more modular marketing messages for the customer. The output generated by analysis server 602 from analyzing biometric data 614, external data 614 and internal data 612 using an appropriate data model in set of data models 604 may include marketing message criteria for the customer.

Derived marketing messages 626 uses the marketing message criteria and/or any for the customer to select one or more modular marketing messages in modular marketing messages 624. In other words, derived marketing messages 626 uses the output of one or more data models in set of data models 604 that were used to analyze internal data and/or external data. The output of the one or more data models is used to identify one or more modular marketing messages to be combined together to form the personalized marketing message for the customer.

Dynamic marketing message assembly 628 is a software component for combining the one or more modular marketing messages selected by derived marketing messages 626 to form customized marketing message 630. In other words, dynamic marketing message assembly 628 combines selected modular marketing messages from modular marketing messages 624 to create an appropriate customized marketing message 630 for the customer. In this manner, dynamic marketing message assembly 628 provides assembly of customized marketing message 630 based on output from the data models analyzing internal data and/or external data associated with the customer.

Customized marketing message 630 is a customized and unique marketing message. The marketing message is a one-to-one customized marketing message for a specific customer. Customized marketing message 630 is generated using the customer's demographics, psychographics, and other external factors to achieve this unique one-to-one marketing.

Customized marketing message 630 is generated for a particular customer based on dynamic customer data elements, such as external and internal customer data. For example, if modular marketing messages 624 include marketing messages identified by numerals 1-20, customized marketing message 630 may be generated using marketing messages 2, 8, 9, and 19. In this example, modular marketing messages 2, 8, 9, and 19 are combined to create a customized marketing message that is generated for display to the customer rather than displaying the exact same marketing messages to all customers. Customized marketing message 630 is displayed on display device 632.

Customized marketing message 630 may include advertisements, sales, special offers, incentives, opportunities, promotional offers, rebate information and/or rebate offers, discounts, and opportunities. An opportunity may be a take action opportunity such as asking the customer to make an immediate purchase, select a particular item, and/or request a download or other action.

Customized marketing message 630 may be a still image, a moving video image, an audio only message, an audio and video message, and/or a printed message. Customized marketing message 630 may include content or messages pushing advertisements and opportunities to effectively and appropriately drive the point of contact customer to some conclusion or reaction desired by the merchant. Customized marketing message 630 is formed in a dynamic closed loop manner in which the content delivery depends on profile data 606 and granular demographics 608. All interchanges with the customer may therefore collect and sense customer behavior which is used to generate customized marketing message 630.

Display device 632 is a multimedia display for presenting customized marketing messages to one or more customers. Display device 632 may be a multimedia display, such as, but not limited to, display devices 214, 216, and 226 in FIG. 2. Display device 632 may include a digital video display for presenting still image content and moving video image content, a speaker or other sound generation device for presenting audio content, and/or a printing device for printing content on a paper medium. Display device 632 may be, for example, a personal digital assistant (PDA), a cellular telephone with a display screen, an electronic sign, a laptop computer, a tablet PC, a kiosk, a digital media display, a display screen mounted on a shopping container, and/or any other type of device for displaying digital messages to a customer.

Thus, a merchant has a capability for interacting with the customer by sending customized marketing message 630 to display device 632. Customized marketing message 630 may be sent and displayed to the customer via a web site accessed as a unique URL (uniform resource location) address on the World Wide Web, as well as any other networked connectivity or conventional interaction including but not limited to telephone, terminal, cell phone or print media.

In this example, customized marketing message 630 is generated and delivered to the customer in response to an analysis of internal customer data and external customer data. Internal customer data includes, but is not limited to, point of contact constraints of display device 632, current actions, profiled past, transactional history, and granular demographics. External customer data is dynamic data gathered by one or more detectors located externally to the retail facility.

Figure 7:
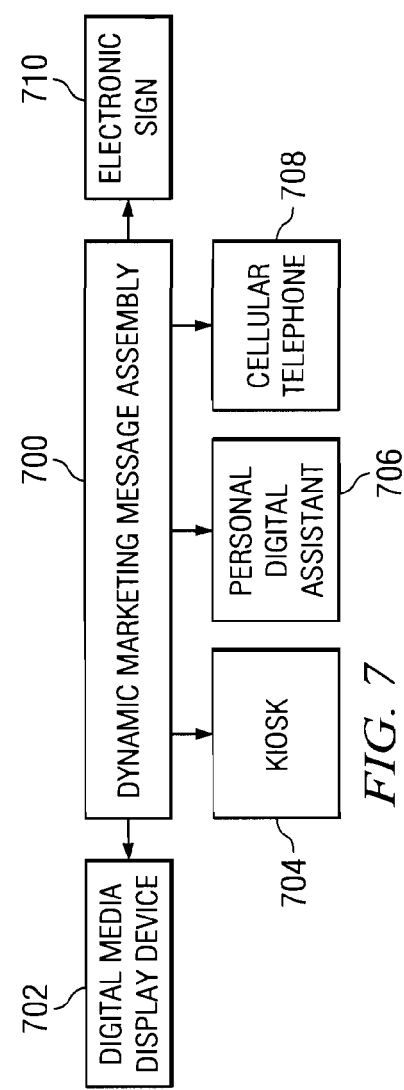
FIG. 7 is a block diagram of a dynamic marketing message assembly transmitting a customized marketing message to a set of display devices in accordance with an illustrative embodiment.

FIG. 7 is a block diagram of a dynamic marketing message assembly transmitting a customized marketing message to a set of display devices in accordance with an illustrative embodiment. Dynamic marketing message assembly 700 is a software component for combining two or more modular marketing messages into a customized marketing message for a customer. Dynamic marketing message assembly 700 may be a component such as dynamic marketing message assembly 628 in FIG. 6.

Dynamic marketing message assembly 700 transmits a customized marketing message, such as customized marketing message 630 in FIG. 6, to one or more display devices in a set of display devices. In this example, the set of display devices includes, but is not limited to, digital media display device 702, kiosk 704, personal digital assistant 706, cellular telephone 708, and/or electronic sign 710. Although FIG. 7 illustrates a set of display devices including one each of a digital media display device 702, kiosk 704, personal digital assistant 706, cellular telephone 708, and/or electronic sign 710, a set of display devices in accordance with the illustrative embodiments may include any combination of display devices and any number of each type of display device. For example, a set of display devices may include, without limitation, six kiosks, fifty personal digital assistants, and no cellular telephones. In another example, the set of display devices may include electronic signs and kiosks but no personal digital assistants or cellular telephones.

Digital media display device 702 is any type of known or available digital media display device for displaying a marketing message. Digital media display device 702 may include, but is not limited to, a monitor, a plasma screen, a liquid crystal display screen, and/or any other type of digital media display device.

Kiosk 704 is any type of known or available kiosk. In one embodiment, a kiosk is a structure having one or more open sides, such as a booth. The kiosk includes a computing device associated with a display screen located inside or in association with the structure. The computing device may include a user interface for a user to provide input to the computing device and/or receive output. For example, the user interface may include, but is not limited to, a graphical user interface (GUI), a menu-driven interface, a command line interface, a touch screen, a voice recognition system, an alphanumeric keypad, and/or any other type of interface.

Personal digital assistant 706 is any type of known or available personal digital assistant (PDA), such as, but not limited to, personal digital assistant 400 in FIG. 4 and/or personal digital assistant 500 in FIG. 5.

Cellular telephone 708 is any type of known or available cellular telephone and/or wireless mobile telephone. Cellular telephone 708 includes a display screen that is capable of displaying pictures, graphics, and/or text. Additionally, Cellular telephone 708 may also include an alphanumeric keypad, joystick, and/or buttons for providing input to cellular telephone 708. The alphanumeric keypad, joystick, and/or buttons may be used to initiate various functions in cellular telephone 708. These functions include for example, activating a menu, displaying a calendar, receiving a call, initiating a call, displaying a customized marketing message, saving a customized marketing message, and/or selecting a saved customized marketing message.

Electronic sign 710 is any type of electronic messaging system. For example, electronic sign 710 may include, without limitation, an outdoor and/or outdoor electronic light emitting diode (LED) display, moving message boards, variable message sign, tickers, electronic message centers, video boards, and/or any other type of electronic signage.

Figure 8:
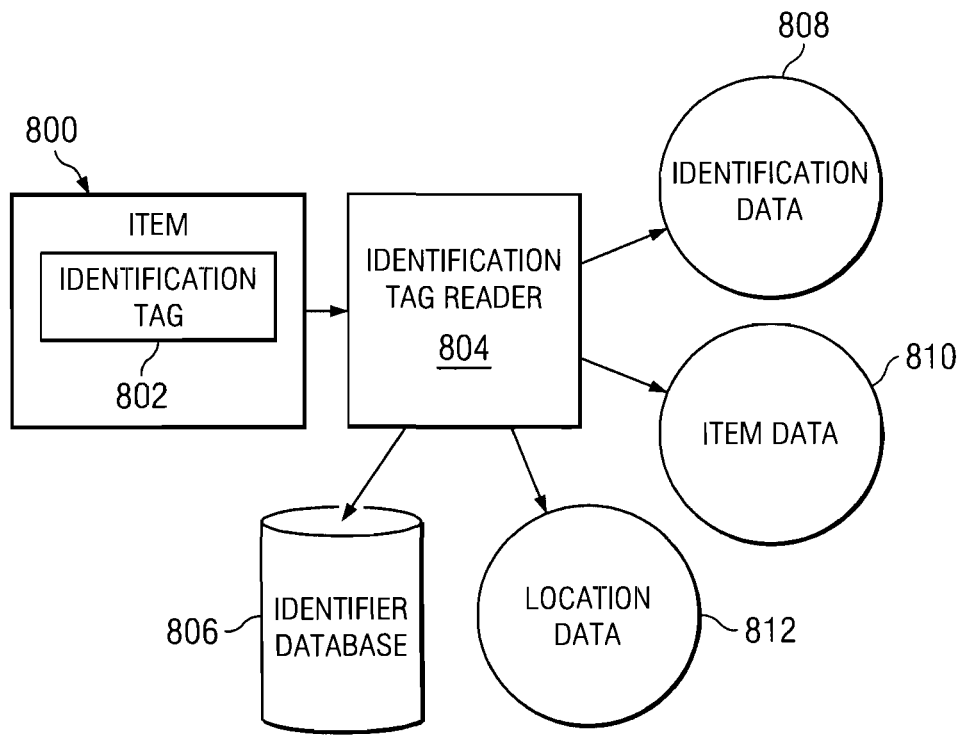
FIG. 8 is a block diagram of an identification tag reader for gathering data associated with one or more items in accordance with an illustrative embodiment.

Turning now to FIG. 8, a block diagram of an identification tag reader for gathering data associated with one or more items is shown in accordance with an illustrative embodiment. Item 800 is any type of item, such as retail items 228 in FIG. 2. Identification tag 802 associated with item 800 is a tag for providing information regarding item 800 to identification tag reader 804. Identification tag 802 is a tag such as a tag in identification tags 230 in FIG. 2. Identification tag 802 may be a bar code, a radio frequency identification tag, a global positioning system tag, and/or any other type of tag.

Radio Frequency Identification tags include read-only identification tags and read-write identification tags. A read-only identification tag is a tag that generates a signal in response to receiving an interrogate signal from an item identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes. In this example, identification tag 802 is a radio frequency identification tag.

Identification tag reader 804 is any type of known or available device for retrieving information from identification tag 802. Identification tag reader 804 may be a tag reader, such as identification tag reader 232 in FIG. 2. For example, identification tag reader 804 may be, but is not limited to, a radio frequency identification tag reader or a bar code reader. A bar code reader is a device for reading a bar code, such as a universal product code.

In this example, identification tag reader 804 provides identification data 808, item data 810, and/or location data 812 to an analysis server, such as analysis server 602 in FIG. 6. Identification data 808 is data regarding the product name and/or manufacturer name of item 800. Item data 810 is information regarding item 800, such as, without limitation, the regular price, sale price, product weight, and/or tare weight for item 800.

Location data 812 is data regarding a location of item 800 within the retail facility and/or outside the retail facility. For example, if identification tag 802 is a bar code, the item associated with identification tag 802 must be in close physical proximity to identification tag reader 804 for a bar code scanner to read a bar code on item 800. Therefore, location data 812 is data regarding the location of identification tag reader 804 currently reading identification tag 802. However, if identification tag 802 is a global positioning system tag, a substantially exact or precise location of item 800 may be obtained using global positioning system coordinates obtained from the global positioning system tag.

Identifier database 806 is a database for storing any information that may be needed by identification tag reader 804 to read identification tag 802. For example, if identification tag 802 is a radio frequency identification tag, identification tag will provide a machine readable identification code in response to a query from identification tag reader 804. In this case, identifier database 806 stores description pairs that associate the machine readable codes produced by identification tags with human readable descriptors. For example, a description pair for the machine readable identification code "10101010111111" associated with identification tag 802 would be paired with a human readable item description of item 800, such as "orange juice." An item description is a human understandable description of an item. Human understandable descriptions are for example, text, audio, graphic, or other representations suited for display or audible output.

Figure 9:
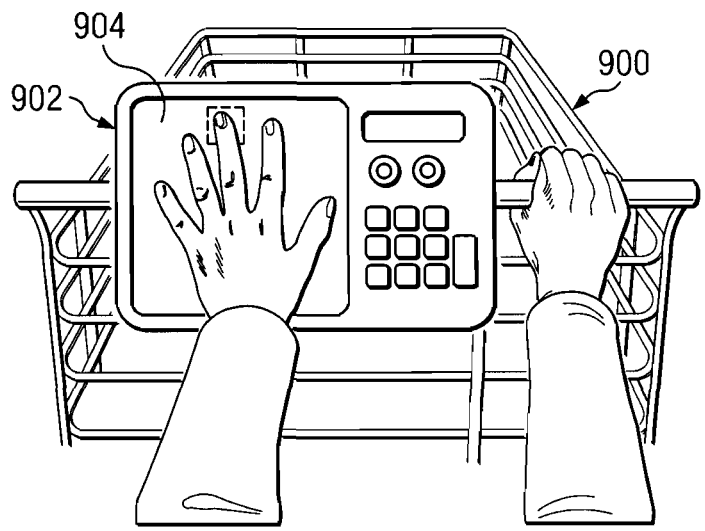
FIG. 9 is a block diagram of a shopping container in accordance with an illustrative embodiment.

FIG. 9 is a block diagram of a shopping container in accordance with an illustrative embodiment. Shopping container 900 is a container for carrying, moving, or holding items selected by a customer, such as container 220 in FIG. 2. In this example, container 900 is a shopping cart.

Display device 902 is a multimedia display device for presenting or displaying customized digital marketing messages to one or more customers, such as display devices 226 in FIG. 2, personal digital assistant 400 in FIG. 4, personal digital assistant 500 in FIG. 5, and/or display device 630 in FIG. 6. In this example, display device is coupled to shopping container 900. Display device 902 displays customized digital marketing messages received from a derived marketing messages device, such as derived marketing messages 626 in FIG. 6.

Biometric device 904 is any type of known or available device for measuring a physiological response or trait associated with a customer. Biometric device 904 is a biometric device, such as, without limitation, biometric device 222 in FIG. 2. Biometric device 904 may be a biometric device for measuring a customer's heart rate over a given period of time, a change in voice stress for the customer's voice, a change in blood pressure, and/or a change in pupil dilation that does not correlate or correspond to a change in an ambient lighting level.

In this example, biometric device 904 is coupled to shopping container 900. Biometric device 904 monitors biometric readings of a customer and detects changes in the biometric readings of the customer that exceeds a threshold change. In this example, biometric device 904 is a device for measuring a customer's heart rate over time. Biometric device 904 obtains the customer's pulse rate by measuring the customer's finger pulse.

In another embodiment, biometric device 904 may also identify a customer based on a fingerprint scan, voiceprint analysis, and/or retinal scan. For example, biometric device 904 may dynamically identify the customer by scanning the customer's fingerprint and/or analyzing fingerprint data associated with the customer to determine the customer's identity. In one example, biometric device 904 may, but is not required to, connected to a remote data storage device storing data to retrieve customer fingerprint data for use in identifying a given customer using the customer's fingerprint. Biometric device 904 may be connected to the remote data storage device via a wireless network connection, such as network 102 in FIG. 1.

In this example, biometric device 904 is coupled, attached, or imbedded in a handle of shopping container 900. However, biometric device 904 may be coupled, attached, or imbedded in or on any part or member of shopping container 900.

In another embodiment, biometric device 904 is coupled, attached, associated with, or imbedded within display device 902. In this example, display device 902 may use biometric device 904 to dynamically identifying the customer by scanning the customer's fingerprint and/or analyzing data associated with the customer's fingerprint to determine the customer's identity.

Figure 10:
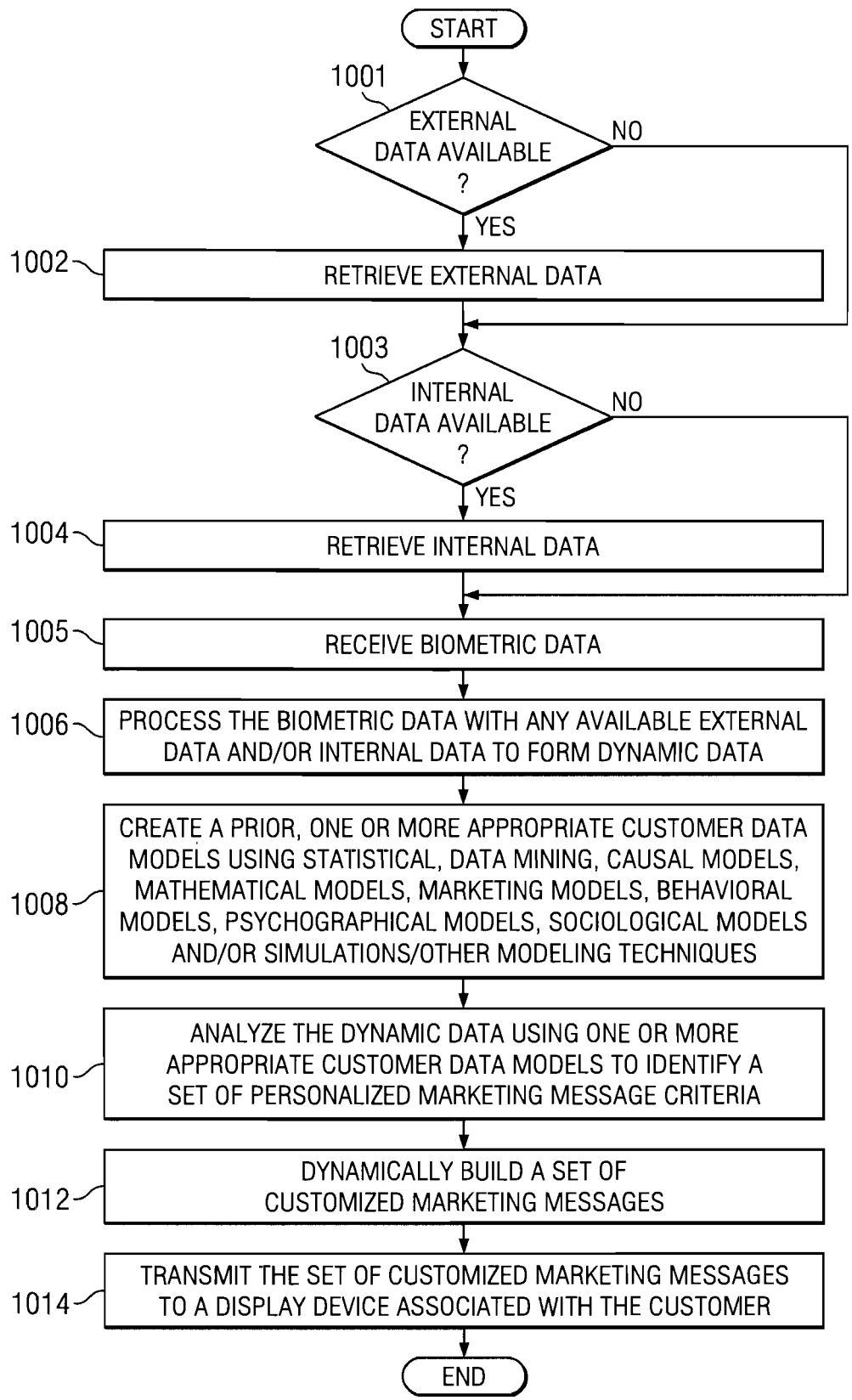
FIG. 10 is a flowchart illustrating a process for analyzing dynamic customer data elements to generate customized digital marketing messages in accordance with an illustrative embodiment.

FIG. 10 is a flowchart illustrating a process for analyzing dynamic customer data elements to generate customized marketing messages in accordance with an illustrative embodiment. The process in steps 1001-1010 may be implemented by an analysis server, such as analysis server 602 in FIG. 6. The process in steps 1012-1014 may be implemented by a component for dynamically generating a customized marketing message, such as dynamic marketing message assembly 628 in FIG. 6.

The process begins by making a determination as to whether external data associated with a set of customers is available (step 1002). The set of customers may include one or more customers. The set of customers is a subset of the customers in the retail facility. In other words, the set of customers does not include all the customers in the retail facility. Instead, the set of customers is a set of one or more customers that are associated with each other. For example, the set of customers may be a group of customers that arrived at the retail facility in a common transportation vehicle, such as a group of customers that arrive in the same car or on the same bus. Customers that are associated with each other may also include two or more customers that walk in close proximity of each other. In another embodiment, a set of customers may be a group of two or more customers that walk within a predetermined radius of each other over a predetermined period of time. For example, if two or more customers walk within a five foot radius of each other over a two minute time period before entering the retail facility and/or over a five minute time period after entering the retail facility, it may be determined that the two customers are a set of customers.

If external data is available, the process retrieves the external data (step 1002). External data associated with the customer is data gathered by one or more detectors located externally to a retail facility, such as retail facility 202 in FIG. 2. External data may be data regarding the customer, the customer's property, vehicle, pets, family members, children, and/or companions. A vehicle may be any type of conveyance, including, but not limited to, a car, bus, truck, motorcycle, bicycle, or any other type of vehicle.

After retrieving the external data in step 1002 or if no external data is available in step 1001, the process makes a determination as to whether any internal data associated with the set of customers is available (step 1003). If internal data is available, the process retrieves the internal data (step 1004). Internal customer data may be retrieved from customer profile data and granular demographics data that is pre-generated and/or stored in a database. Internal customer data may also include data associated with the customer that is dynamically gathered inside the retail facility.

After retrieving the internal data in step 1004 or if no internal data is available in step 1003, the process receives biometric data from a set of biometric devices (step 1005). The biometric devices may be located inside the retail facility or outside the retail facility.

The biometric data is processed with any available external data and/or internal data associated with the set of customers to form dynamic data (step 1006). Processing biometric data, internal data, and/or external data may include filtering the data and/or formatting the data to form the dynamic data.

The process pre-generates or creates in advance, one or more appropriate data models using at least one of a statistical method, data mining method, causal model, mathematical model, marketing model, behavioral model, psychographical model, sociological model, simulations/modeling techniques, and/or any combination of models, data mining, statistical methods, simulations and/or modeling techniques (step 1008). The process analyzes the dynamic data using one or more of the appropriate data models to identify a set of personalized marketing message criteria (step 1010). The set of personalized marketing message criteria may include one or more criterion for generating a personalized marketing message.

The process dynamically builds a set of one or more customized marketing messages (step 1012) using the personalized marketing message criteria. The process transmits the set of customized marketing messages to a display device associated with the customer (step 1014) for presentation of the marketing message to the customer, with the process terminating thereafter. Displaying the customized marketing message to the set of customers may include displaying the customized marketing message on an electronic display as an video and/or audio message, displaying the customized marketing message as a static digital message, emailing or text messaging the customized marketing message, printing the customized marketing message on a paper medium, and/or playing the customized marketing message as an audio only message.

In this example, any internal data is combined with any external data and the biometric data to form the dynamic data that is analyzed by one or more data models. However, in another embodiment, any internal data is only combined with biometric data and the internal data is not combined with any external data. Likewise, in another embodiment, any external data is only combined with biometric data.

Figure 11:
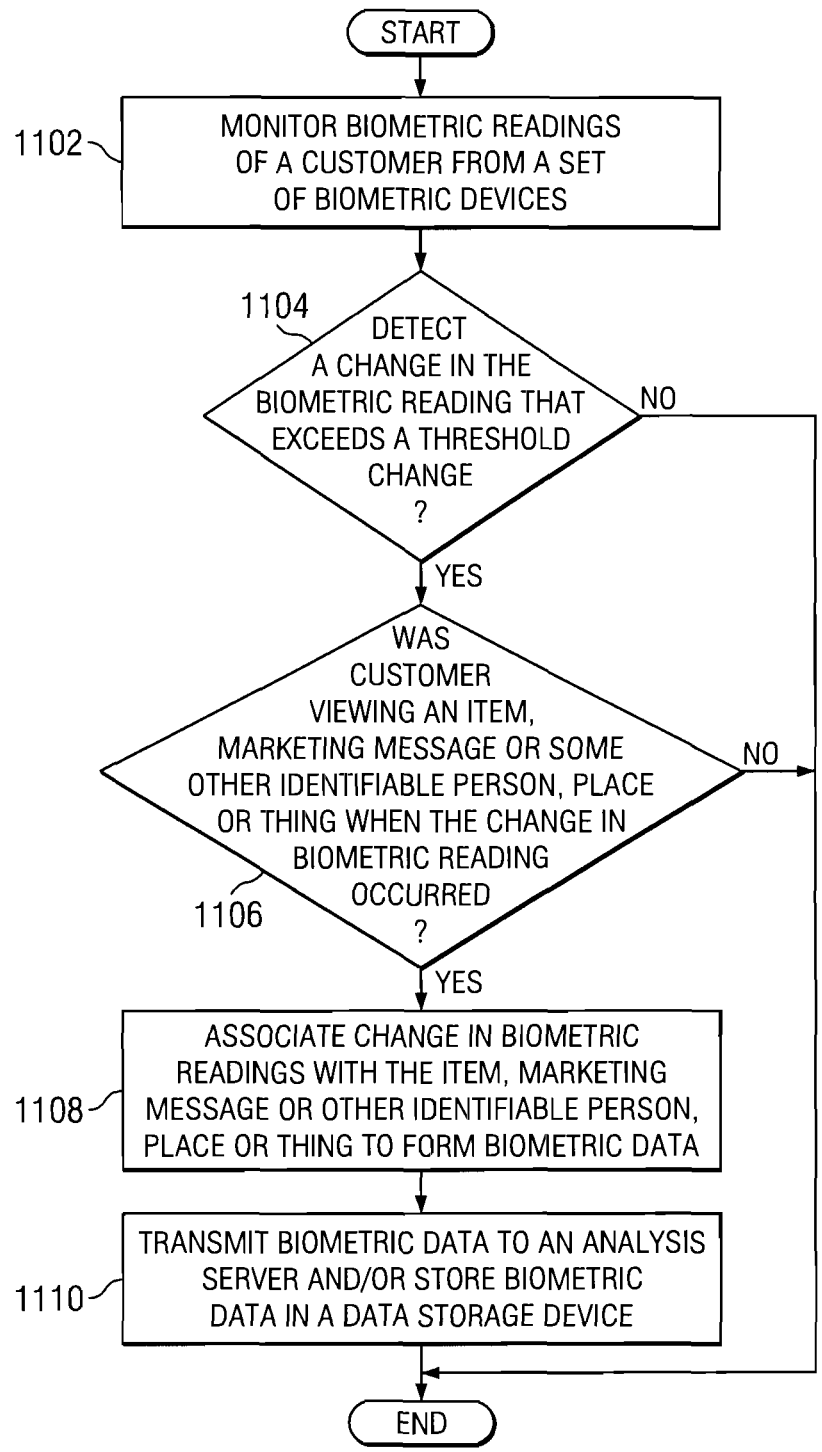
FIG. 11 is a flowchart illustrating a process for monitoring for a change in biometric readings associated with a customer in accordance with an illustrative embodiment.

Turning now to FIG. 11, a flowchart illustrating a process for monitoring for a change in biometric readings associated with a customer is depicted in accordance with an illustrative embodiment. The process may be implemented by a device for measuring physiological responses and/or traits of a customer, such as biometric device 218 in FIG. 2 and/or biometric device 904 in FIG. 9.

The process begins by monitoring biometric readings of a customer obtained from a set of one or more biometric devices (step 1102). The process makes a determination as to whether a change in the biometric readings that exceeds a threshold change has been detected (step 1104). If a change exceeding the threshold is not detected, the process terminates thereafter.

Returning to step 1104, if a change exceeding the threshold is detected, the process makes a determination as to whether the customer was viewing an item, a marketing message, or some other identifiable person, place, or thing when the change in biometric readings occurred (step 1106). If the customer was not viewing an item, a marketing message, or some other identifiable person, place, or thing, the process terminates thereafter.

Returning to step 1106, if the customer was viewing an item, marketing message, or something else identifiable, the process associates the change in biometric reading with the item, the marketing message, or the identifiable person, place, or thing to form the biometric data (step 1108). The process transmits the biometric data to an analysis server and/or stores the biometric data in a data storage device for later use in generating customized marketing messages in the future (step 1110) with the process terminating thereafter.

Thus, the illustrative embodiments provide a computer implemented method, apparatus, and computer usable program code for customizing marketing messages using biometric data. In one embodiment, data is received from a set of biometric devices associated with a retail facility to form the biometric data. The biometric data is associated with a given customer. The biometric data is processed to form dynamic data. The dynamic data is analyzed using a data model to identify personalized marketing message criteria for the customer. A customized marketing message is generated using the personalized marketing message criteria.

The illustrative embodiments provide a safe, productive, and risk-free retail environment where good customers can continue to experience maximum price benefits. The illustrative embodiments allow merchants to encourage impulse shopping and manage market basket revenue.

Biometric data may be used to determine if a user is interested or disinterested in an item or advertisement based on changes in biometric data that exceeds a threshold or baseline change. For example, a change in heart rate or pupil dilation may indicate an interest or desire in a particular product. Also, data such as voice stress may be used to determine if a customer is receptive to advertising at the current moment, if the customer is stressed, tired, or relaxed. This data may be used to customize marketing messages in real time based on the customer's current mood and responses to the environment and changing stimuli presented to the customer.

The preferences or likes and dislikes of a customer may better be determined and exploited to increase sales of items to the targeted customer. Biometric data associated with a customer may be used to identify a customer, such as by a voice print or fingerprint. This may enable maximizing or optimizing sales of retail items sold to a customer at each visit the customer makes to the retail facility, which translates into maximizing or optimizing the potential wallet share attributable to the customer.

In addition, because marketing incentives are presented to a customer on a digital display device, shelving space is no longer at a premium. The location of an item on the shelf, such as at eye level as opposed to being placed at floor level, will be less important in view of the marketing incentives being pushed to the customer as the customer shops.

The embodiments also permit increased monitoring of purchased and/or offered items per customer segment and more effective marketing campaigns. Thus, a retail outlet may conservatively increase sales/profits by ten to twenty percent on a year to year basis.

In this manner, marketing messages may be tailored to a particular customer to increase the customer's purchases and avoid a customer developing negative associations with a particular product due to inappropriate advertising.

The flowcharts and block diagrams in the different depicted embodiments illustrate the architecture, functionality, and operation of some possible implementations of apparatus, methods and computer program products. In this regard, each step in the flowchart or block diagrams may represent a module, segment, or portion of code, which comprises one or more executable instructions for implementing the specified function or functions. In some alternative implementations, the function or functions noted in the step may occur out of the order noted in the figures. For example, in some cases, two steps shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating customized marketing messages for a customer using biometric data, the computer implemented method comprising:
    receiving, by a processor, data from a set of biometric devices associated with a retail facility to form the biometric data, wherein the biometric data is associated with a customer;
    processing, by the processor, the biometric data to form dynamic data;
    analyzing, by the processor, the dynamic data using a data model to identify personalized marketing message criteria for the customer;
    generating, by the processor, a customized marketing message for the customer using the personalized marketing message criteria;
    detecting a change in a biometric reading associated with the customer that exceeds a threshold change; and
    responsive to a determination that the customer was viewing an item or a marketing message when the change in the biometric reading occurred, associating the change in the biometric reading with the item or the marketing message to form the biometric data.

2. The computer implemented method of claim 1 wherein processing the biometric data associated with the customer further comprises:
    processing, by the processor, the biometric data with external data to form the dynamic data, wherein external data is data gathered by a set of detectors located outside the retail facility and wherein external data identifies a presence of a set of customers outside the retail facility.

3. The computer implemented method of claim 1 wherein processing the biometric data associated with the customer further comprises:
    processing, by the processor, the biometric data with internal data to form the dynamic data, wherein the internal data is data associated with a customer that is gathered by a set of detectors located inside the retail facility.

4. The computer implemented method of claim 1 wherein the set of biometric devices associated with the retail facility includes at least one biometric device located outside the retail facility for gathering the biometric data associated with the customer.

5. The computer implemented method of claim 1 wherein the set of biometric devices associated with the retail facility includes at least one biometric device located inside the retail facility for gathering the biometric data associated with the customer.

6. The computer implemented method of claim 1 wherein analyzing the dynamic data using a data model to identify personalized marketing message criteria for the customer further comprises:
    serially analyzing, by the processor, the dynamic data in a set of data models, wherein results of analyzing the dynamic data in a first data model is utilized as input for analysis in a next data model in the set of data models.

7. The computer implemented method of claim 1 wherein biometric data is data regarding a status state of a customer.

8. The computer implemented method of claim 1 wherein biometric data is data regarding a set of physiological responses of the customer.

9. The computer implemented method of claim 1 wherein the biometric reading is a measurement of a vital statistics of the customer over a given period of time.

10. The computer implemented method of claim 9 wherein the vital statistics of the customer includes at least one of a heart rate of the customer, respiratory rate, and blood pressure.

11. The computer implemented method of claim 1 wherein the biometric reading is at least one of a measurement of a change in voice stress for the voice of the customer and a measurement of a change in a dilation of a pupil of the customer.

12. The computer implemented method of claim 1 further comprising:
    dynamically identifying, by the processor, the customer using a biometric device.

13. The computer implemented method of claim 12 wherein the biometric device is a fingerprint scanning device and further comprising:
    identifying, by the processor, the customer using a fingerprint of the customer, wherein the fingerprint of the customer is obtained from the fingerprint scanning device.

14. The computer implemented method of claim 1 further comprising:
    delivering, by the processor, the customized marketing message to a display device associated with the customer for display to the customer, wherein the customized marketing message is dynamically updated in response to the biometric data associated with the customer.

15. The computer implemented method of claim 1 wherein the biometric data is gathered by at least one biometric device in the set of biometric devices located outside of the retail facility.

16. The computer implemented method of claim 1 wherein the biometric data is gathered by at least one biometric device in the set of biometric devices located inside of the retail facility.

17. A computer program product comprising:
    a computer usable medium including computer usable program code for customizing marketing messages using biometric data, said computer program product comprising:
    computer usable program code for receiving data from a set of biometric devices associated with a retail facility to form the biometric data, wherein the biometric data is associated with a customer;
    computer usable program code for processing the biometric data to form dynamic data;
    computer usable program code for analyzing the dynamic data using a data model to identify personalized marketing message criteria for the customer;

computer usable program code for generating a customized marketing message for the customer using the personalized marketing message criteria;

computer usable program code for detecting a change in a biometric reading associated with the customer that exceeds a threshold change; and computer usable program code for associating the change in the biometric reading with the item or the marketing message to form the biometric data in response to a determination that the customer was viewing an item or a marketing message when the change in the biometric reading occurred.

18. The computer program product of claim 17 further comprising:

computer usable program code for processing the biometric data with external data to form the dynamic data, wherein external data is data gathered by a set of detectors located outside the retail facility and wherein external data identifies a presence of a set of customers outside the retail facility.

19. The computer program product of claim 17 further comprising:

computer usable program code for processing the biometric data with internal data to form the dynamic data, wherein the internal data is data associated with a customer that is gathered by a set of detectors located inside the retail facility.

20. The computer program product of claim 17 wherein the set of detectors associated with the retail facility includes at least one biometric device located inside the retail facility for gathering the biometric data associated with the customer.

21. The computer program product of claim 17 further comprising:

computer usable program code for delivering the customized marketing message to a display device associated with the customer for display to the customer, wherein the customized marketing message is dynamically updated in response to the biometric data associated with the customer.

22. The computer program product of claim 17 further comprising:

computer usable program code for dynamically identifying the customer using a biometric device.

23. The computer program product of claim 22 wherein the biometric device is a fingerprint scanning device and further comprising:

computer usable program code for identifying the customer using a fingerprint of the customer, wherein the fingerprint of the customer is obtained from the fingerprint scanning device.

24. A system for customizing marketing messages at the customer level using biometric data, the system comprising:

a set of biometric devices associated with a retail facility, wherein the set of biometric devices gathers data associated with a customer to form biometric data, wherein the set of biometric devices detects a change in a biometric reading associated with the customer that exceeds a threshold change;

an analysis server, wherein the analysis server processes the biometric data to form dynamic data, and wherein the analysis server analyzes the dynamic data using a data model to identify personalized marketing message criteria for the customer, and wherein responsive to a determination that the customer was viewing an item or a marketing message when the change in the biometric reading occurred, the analysis server associates the change in the biometric reading with the item or the marketing message to form the biometric data; and a dynamic marketing message assembly, wherein the dynamic marketing message assembly generates a customized marketing message for the customer using the personalized marketing message criteria.

25. The system of claim 24 wherein the set of biometric devices associated with a retail facility further comprises:

a set of biometric devices located externally to the retail facility, wherein the set of biometric devices located externally to the retail facility generates data associated with the customer to form the biometric data.

26. The system of claim 24 wherein the set of biometric devices associated with a retail facility further comprises:

a set of biometric devices located inside the retail facility, wherein the set of biometric devices located inside the retail facility generates data associated with the customer to form the biometric data.

27. The system of claim 24 wherein the set of biometric devices associated with the retail facility further comprises:

a biometric device coupled to a shopping cart, wherein the biometric device coupled to the shopping cart gathers data associated with the customer to form the biometric data.

28. The system of claim 24 further comprising:

a biometric device coupled to a shopping basket associated with the customer.

29. The system of claim 24 further comprising:

a biometric device coupled to a shelf associated with the retail facility, wherein the biometric device gathers data associated with the customer to form the biometric data.

30. The system of claim 24 wherein the set of biometric devices associated with a retail facility further comprises:

a biometric device coupled to a handle of a shopping cart.

31. The system of claim 24 wherein at least one biometric device in the set of biometric devices associated with the retail facility includes a biometric device, wherein the biometric device gathers biometric data for dynamically identifying the customer.

32. The system of claim 24 wherein the at least one biometric device in the set of biometric devices for dynamically identifying the customer includes at least one of a fingerprint scanner, a thumbprint scanner, a palm scanner, a retina scanner, and a voice print scanner.

33. The system of claim 24 further comprising:

a biometric device coupled to a display device associated with the customer.

* * * * *